(12) United States Patent
Kubo et al.

(10) Patent No.: US 6,252,502 B1
(45) Date of Patent: Jun. 26, 2001

(54) ALARM DETECTION APPARATUS

(75) Inventors: Masaki Kubo; Masaru Kameda; Shigeyuki Kobayashi, all of Yokohama; Junichi Ishiwatari, Kawasaki; Shuniti Nakayama; Hideo Sunaga, both of Yokohama; Nobuyuki Nemoto, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/404,065

(22) Filed: Sep. 23, 1999

(30) Foreign Application Priority Data

Nov. 26, 1998 (JP) .................................................. 10-335209

(51) Int. Cl.[7] .................................................. G08B 29/00
(52) U.S. Cl. .......................... 340/506; 340/507; 340/526; 371/5.1; 371/5.5
(58) Field of Search ..................................... 340/506, 507, 340/511, 526; 371/5.1, 5.5

(56) References Cited

U.S. PATENT DOCUMENTS 5,138,616 * 8/1992 Wagner et al. ........................ 371/5.1

* cited by examiner

Primary Examiner—Daryl Pope
(74) Attorney, Agent, or Firm—Helfgott & Karas, P.C.

(57) ABSTRACT

An alarm detection apparatus includes a plurality of alarm detectors detecting and/or cancelling alarms for identical and different error rates. The plurality of alarm detectors are grouped into a major detector unit made up of alarm detectors which detect major error rates, and a minor detector unit made up of alarm detectors which detect minor error rates. The major detector unit and the minor detector unit output detection outputs corresponding to specified detection rates thereof. A predetermined alarm detector corresponding to a part of the minor detector unit has a specified detection rate overlapping a specified detection rate of the major detector unit being controlled, so that a detection function or a detection output of the predetermined alarm detector is disabled.

12 Claims, 18 Drawing Sheets

FIG.3

| ERROR RATE | NO. OF MONITORING FRAMES | NO. OF ERRORS | CONSECUTIVE NO. | DETECTION TIME | HYSTERESIS (TIMES) |
|---|---|---|---|---|---|
| $10^{-3}$ | 1 | 980 | 58 | 7.25ms | 10 |
| $10^{-4}$ | 4 | 415 | 15 | 7.5ms | 10 |
| $10^{-5}$ | 40 | 415 | 15 | 75ms | 10 |
| $10^{-6}$ | 400 | 415 | 15 | 750ms | 10 |
| $10^{-7}$ | 4000 | 415 | 15 | 7.5s | 10 |
| $10^{-8}$ | 40000 | 415 | 15 | 75s | 10 |
| $10^{-9}$ | 400000 | 415 | 15 | 750s | 10 |
| $10^{-10}$ | 4000000 | 415 | 15 | 7500s | 1 |

ALARM DETECTION APPARATUS

BACKGROUND OF THE INVENTION

1. Field of the Invention

The present invention generally relates to alarm detection apparatuses, and more particularly to an alarm detection apparatus which detects and/or cancels an alarm depending on an error rate of a data communication line.

In systems such as a Synchronous Optical Network (SONET) or a Synchronous Digital Hierarchy (SDH), a quality of a digital line is monitored by use of a B2 byte (BIP: Bit Interleaved Parity-8) or a B2 byte (BIP-8×N(in the case of the SONET)/BIP-N×24 (in the case of the SDH) of a frame format. The present invention is suited for application to such systems.

2. Description of the Related Art

FIG. 1 is a diagram showing a frame format of a SONET Synchronous Transport Signal-N (STS-N) for a case where N=192. At a transmitting end, a BIP operation result indicated by a hatched portion of an nth frame before scrambling is inserted into the B2 byte of a (n+1)th frame before the scrambling. On the other hand, at a receiving end, a BIP operation result with respect to the nth frame after descrambling thereof and a B2 byte of the (n+1)th frame after descrambling are compared, so as to detect a BIP error. According to STS-192, 1 B2 byte is multiplexed 192 times, and BIP-8×192 (8×192=1536 bits) BIP operations are carried out in total. Although not shown in FIG. 1, BIP operation and monitoring are similarly carried out with respect to the B1 byte, although an operation range differs from that for the B2 byte.

For the sake of convenience, the error rate will be described with respect to the BIP-8 of the STS-1 in order to simplify the description. The error rate for a case where only 1 bit within 1 frame is in error and no error exists in the other bits can be described by $1/(801\times8)=1/6408 \neq 1.5\times10^{-4}$. Accordingly, it is possible to monitor whether or not the error rate is $1\times10^{-9}$ or greater, for example, by monitoring whether or not a BIP-8 error of 1 bit exists in $1.5\times10^5$ frames or, a BIP-8 error of 10 or more bits exist in $1.5\times10^6$ frames. Timewise, 1 frame period of the STS-N (STM-N) is 125 μsec, and thus, it requires at least approximately 19 sec in order to monitor the above error rate of $1\times10^{-9}$. Actually, there are cases where a check is made to determine whether or not such a single bit error occurs 100 or more times so as to improve the monitoring accuracy. In such cases, the monitoring unit becomes 100 times the above period, that is, approximately 32 minutes.

FIG. 2 is a system block diagram showing a conventional alarm detector. FIG. 2 shows a typical construction which is used in common for alarm detectors $10_1$ through $10_{10}$ which will be described later. In FIG. 2, an error counter (ERCT) 11 counts an error bit B2E of the BIP (B2 byte), and a protection counter (PRCT) 12 counts a number of protection times of the alarm detection and/or cancellation. A frame counter (FRCT) 13 counts a frame pulse B2FP which has a period of 125 μsec and is generated in synchronism with the B2 byte of the STS-N frame. A timing decoder (TDC1) 15-1 decodes a counter output Q of the frame counter 13, and generates an alarm detection timing signal (for example, 1T) which is used for alarm detection. A hysteresis counter (HYCT) 14 counts a pulse signal which is generated with a period of the alarm detection timing signal 1T. A timing decoder (TDC2) 15-2 decides a counter output Q of the hysteresis counter 14, and generates an alarm cancel detection timing signal (for example, 10T which is 10 times the period) which is used for alarm cancel detection. Comparators (CM1, CM2) 17-1 and 17-2, AND gate circuits (A1 through A5) 18-1 through 18-2, a selector (SL1) 16, edge detection circuits (EG1, EG2 and EG4 through EG6) 19-1, 19-2 and 19-4 through 19-6 for detecting rising and/or falling edges of input signals and generating edge pulse signals EP1, EP2 and the like, a flip-flop (FF1) 1 for holding an alarm detection and/or cancel state, and OR gate circuits (OR1, OR2) 2-1 and 2-2 are connected as shown in FIG. 2.

Although not shown in FIG. 2, a system clock signal CK19 is input to a clock input terminal CK or the like of each of the counters 11 through 14 and the like. In addition, a system reset signal CL is input to a reset terminal R of each of the counters 11 through 14 and the flip-flop 1.

Next, a description will be given of the operation of the alarm detector 101. The alarm detector $10_1$ is in an alarm detection mode when the flip-flop 1 is reset. In this case, the AND gate circuits 18-1 and 18-3 are closed, and the selector 16 selectively outputs the alarm detection timing signal 1T. As a result, the error counter 11 counts the error bit signal B2E of the B2 byte generated during an interval of the timing (gate) signal 1T. In this state, the comparator 17-1 compares the counter output Q of the error counter 11 and a predetermined threshold value which is 980, for example. When the timing signal 1T thereafter falls, the edge pulse signal EP1 is generated in synchronism with this fall of the timing signal 1T, and if the counter output Q of the error counter 11 is greater than or equal to 980 at this timing, the AND gate circuit 18-1 is opened and the protection counter 12 is incremented by +1. If the counter output Q of the error counter 11 is consecutively greater than or equal to 980 with respect to each detection period 1T, the protection counter 12 is incremented by +1 each time. However, if the counter output Q of the error counter 12 becomes less than 980 at least once during the above time, the protection counter 12 is reset and the count is restarted from the beginning. In this state, the comparator 17-2 compares the counter output Q of the protection counter 12 and a predetermined threshold value which is 58, for example. Hence, if the counter output Q of the protection counter 12 is greater than or equal to 58 at the timing of each edge pulse signal EP2 following the edge pulse signal EP1, the AND gate circuit 18-3 is opened and the flip-flop 1 is set to thereby output an alarm detection signal ALD1=1. In addition, when the flip-flop 1 is set, the protection counter 12 is reset, and the alarm detector $10_1$ then assumes an alarm cancel detection mode.

In the alarm cancel detection mode, the AND gate circuits 18-2, 18-4 and 18-5 are closed, and the selector 16 selectively outputs the alarm cancel detection timing signal 10T. Hence, the error counter 11 counts the error bit signal B2E of the B2 byte generated during an interval of the timing (gate) signal 10T. In this state, the comparator 17-1 compares the counter output Q of the error counter 11 and the and a predetermined threshold value which is 980, for example. When the timing signal 10T thereafter falls, the edge pulse signal EP1 is generated in synchronism with this fall of the timing signal 10T, and if the counter output Q of the error counter 11 is less than 980 at this timing, the AND gate circuit 18-2 is opened and the protection counter 12 is incremented by +1. If the counter output Q of the error counter 11 is consecutively less than 980 with respect to each detection period 10T, the protection counter 12 is incremented by +1 each time. However, if the counter output Q of the error counter 12 becomes greater than or equal to 980 at least once during the above time, the protection counter 12 is reset and the count is restarted from the beginning. In this state, the comparator 17-2 compares the counter output Q of the protection counter 12 and a predetermined threshold value which is 58, for example. Hence, if the counter output Q of the protection counter 12 is greater than or equal to 58 at the timing of each edge pulse signal EP2 following the edge pulse signal EP1, the AND gate circuit 18-4 is opened and the flip-flop 1 is reset to thereby output an alarm detection signal ALD1=0. In addition, when the flip-flop 1 is reset, the protection counter 12 is reset, and the alarm detector $10_1$ then assumes the alarm detection mode.

FIG. 3 is a diagram showing various kinds of setting information for making the alarm detection and/or cancellation. In FIG. 3, in a case where the detected error rate is $10^{-3}$, it is a condition for that alarm detection that the number of errors within 1 frame interval (1T) is greater than or equal to 980 and that this state continues for 58 times or more. The detection time for this case is 7.25 msec. On the other hand, 10 times the period (10T) of the alarm detection is employed for the alarm cancel detection in this case, and a so-called hysteresis control is carried out such that the monitoring conditions are different between the alarm detection and the alarm cancel detection. That is, the condition of the alarm cancel detection is that the number of errors within 10 frames (10T) becomes less than 980 consecutively for 58 or more times. Similar conditions are determined with respect to other error rates of $10^{-4}$ through $10^{-10}$, and examples of the monitoring conditions with respect to each of the error rates are shown in FIG. 3.

FIG. 4 is a system block diagram showing a conventional alarm detection apparatus. FIG. 4 shows the construction for realizing the monitoring conditions shown in FIG. 3. In FIG. 4, a major detector unit 21 detects major alarms MAJALM in the system, and includes alarm detectors $10_1$ through $10_3$ which respectively detect a relatively large number of error rates $10^{-3}$ through $10^{-5}$. A selector (SL1) 23 selectively outputs one of alarm signals MAAL1 through MAAL3 depending on a major detection selection signal MAJRT [1–3] which is input to the system. Hence, the system can monitor the existence of a desired one of the major error rates which is generated. A minor detector unit 22 detects minor alarms MINALM in the system, and includes alarm detectors $10_4$ through $10_{10}$ which respectively detect a relatively small number of error rates $10^{-4}$ through $10^{-10}$. A selector (SL2) 24 selectively outputs one of alarm signals MIAL1 through MIAL8 depending on a minor detection selection signal MINRT [1–7] which is input to the system. Hence, the system can monitor the existence of a desired one of the minor error rates which is generated. An OR gate circuit (OR1) 25 receives a system reset signal RST and a minor reset signal MINRST which will be described later.

A monitoring function of the major detector unit 21 is reset by the system reset signal RST such as a power ON reset signal. On the other hand, a monitoring function of the minor detector unit 22 is reset by the system reset signal RST or the minor reset signal MINRST. The minor reset signal MINRST is generated when a signal disconnection LOS of the line, a synchronization error LOF of the STS-N frame or the like is detected by the system. When a large number of faults is generated, it is sufficient to activate the functions of the major detector unit 21, and the functions of the minor detector unit 22 are deactivated.

In the major detector unit 21, the alarm detection signal MAAL1 from an output terminal ALD of the alarm detector 101 is input to an input terminal ALI of the alarm detector $10_2$, and the alarm detection signal MAAL2 from an output terminal ALD of the alarm detector $10_2$ is input to an input terminal ALI of the alarm detector $10_3$. The alarm detection signals MAAL1 and MAAL2 are input to the edge detection circuit (EG5) 19-5 shown in FIG. 2, and act so as to forcibly set the flip-flop (FF1) 1 in synchronism with the rising edge thereof. Hence, if an alarm signal of the error rate of $10^{-4}$ is detected in FIG. 4, the alarm signal of the error rate of $10^{-5}$ is forcibly set at the same time. In addition, if an alarm signal of the error rate of $10^{-3}$ is detected, the alarm signals of the error rates of $10^{-4}$ and $10^{-5}$ are forcibly set at the same time. Accordingly, even if the detecting conditions (periods) differ among the alarm detectors $10_1$ through $10_3$, when an alarm of a relatively high error rate is detected, all alarms of error rates lower than this relatively high error rate are also detected at the same time, so that detections reasonably adapted to the actual error generation state is realized. Similar detections are also made in the minor detector unit 22.

On the other hand, in the major detector unit 21, it is known to input the alarm detection signal MAAL1 from the most significant alarm detector $10_1$ to input terminals MAAL1 of each of the less significant alarm detectors $10_2$ and $10_3$ as indicated by a dotted line in FIG. 4. The alarm detection signal MAAL1 from the most significant alarm detector $10_1$ is input to the edge detection circuit (EG6) 19-6 which resets or initializes the hysteresis counter 14 and the protection counter 12 in response to the falling edge of the alarm detection signal MAAL1, that is, in response to the alarm cancel detection, as indicated by a dotted line in FIG. 2. Hence, when the alarm detection signal MAAL1 from the most significant alarm detector $10_1$ shown in FIG. 4 is cancelled, the detection phases for the alarm cancellation in each of the less significant alarm detectors $10_2$ and $10_3$ are simultaneously synchronized to the cancellation timing of the alarm detection signal MAAL1 from the most significant alarm detector $10_1$, and the detecting operations for the alarm cancellation are simultaneously started. Although not shown in FIG. 4, it is of course possible to construct the minor detector unit 22 similarly to the major detector unit 21 described above.

But in the conventional system described above, in a case where the error rates such as the error rates $10^{-4}$ and $10^{-5}$ to be detected by the major detector unit 21 and the minor detector unit 22 overlap, no problems will occur if the detection and/or cancellation timings of the major detector unit 21 and the minor detector unit 22 match, however, the detection and/or cancellation timings may not necessarily match. For example, the detection and/or cancellation timings will not match if the reset conditions of the major detector unit 21 and the minor detector unit 22 are different. When the detection and/or cancellation timings of the major detector unit 21 and the minor detector unit 22 are different, there is a problem in that the same kind of alarm signal will be detected and/or be cancelled at different timings within the system.

In addition, according to the conventional system described above which synchronizes the alarm cancel detection timings of each of the less significant alarm detectors $10_2$ and $10_3$ to the cancellation timing of the alarm detection signal MAAL1 from the most significant alarm detector $10_1$, the following problems occur.

FIGS. 5 and 6 are timing charts for explaining the operation of the conventional alarm detection apparatus. In FIGS. 5 and 6, it is assumed for the sake of convenience that the detection period is 1T, 3T and 5T in the most significant order, and that no hysteresis control is carried out for the alarm cancel detection.

FIG. 5 shows a case where an error B2E generated at a high density disappears quickly. The most significant alarm signal ALD1 is quickly set by the generation of the high density burst error, and the less significant alarm signals ALD2 and ALD3 are simultaneously set forcibly in response to the setting of the most significant alarm signal ALD1. Next, when the most significant alarm signal ALD1 is quickly reset (cancelled) due to a rapid decrease of the error generation density, the phases of the alarm cancel detection timing signals 3T and 5T for the less significant alarms are synchronized to the cancellation timing of the alarm signal ALD1. Hence, in this particular case, the alarm signal ALD2 is cancelled at a timing 3T after the cancellation of the most significant alarm signal ALD1, and the alarm signal ALD3 is cancelled at a timing 5T after the cancellation of the most significant alarm signal ALD1. Consequently, it is possible to quickly carry out the alarm detection and/or cancellation operation which is adapted to the actual generation and/or disappearance of the error B2E.

On the other hand, FIG. 6 shows a case where the error B2E generated at a high density gradually reduces its generation rate and disappears. The most significant alarm signal ALD1 is quickly set by the generation of the high density burst error, and is reset quickly as the density thereafter decreases. With respect to the alarm signal ALD2, the alarm cancel detection is started in synchronism with the cancellation timing of the most significant alarm signal ALD1. However, the error density is greater than or equal to a first predetermined value in the first 3T interval and the alarm signal ALD2 is not reset in this first 3T interval, and is finally reset in the second 3T interval. With respect to the alarm signal ALD3, the alarm cancel detection is started in synchronism with the cancellation timing of the most significant alarm signal ALD1. However, the error density is greater than or equal to a second predetermined value which is lower than the first predetermined value in the first and second 5T intervals and the alarm signal ALD3 is not reset in these first and second 5T intervals, and is finally reset in the third 5T interval. Accordingly, there is a problem in that the less significant alarm signal ALD3 is not reset for a considerably long time. This problem is caused by the overlap of the alarm cancel detection timings between the less significant alarm detectors $10_2$ and $10_3$, and because the error bit B2E in the intervals are taken into account for the evaluation by both of the alarm detectors $10_2$ and $10_3$. In this particular case, the periods of the alarm detection cancellation are 1T, 3T and 5T, but the periods of the actual alarm detection cancellation are generally much larger and are 10T, 100T and 1000T, for example. As a result, the differences among the periods of the actual alarm detection cancellation is extremely large, thereby making the delay of the alarm cancel detection no longer negligible.

Furthermore, as shown in FIG. 2, when each alarm detector 10 is constructed to include the frame counter 13 and the hysteresis counter 14, there is a problem in that the circuit scale of the frame counter 13 and the hysteresis counter 14 becomes larger for the alarm detectors provided for the lower error rates as compared to the alarm detectors provided for the higher error rates. In other words, the most significant alarm detector $10_1$ shown in FIG. 2 simply generates the alarm detection timing signal 10T and the alarm cancel detection timing signal 10T based on the frame pulse signal B2FP, but the least significant alarm detector $10_{10}$ shown in FIG. 4 must generate the alarm detection and alarm cancel detection timing signals 4000000T based on the frame pulse signal B2FP. For this reason, a large scale counter circuit is required in the alarm detection apparatus as a whole. Further, since the scale of the counter differs for each alarm detector 10, there is another problem in that a common circuit construction cannot be used for each of the alarm detectors 10.

SUMMARY OF THE INVENTION

Accordingly, it is a general object of the present invention to provide a novel and useful alarm detection apparatus in which the problems described above are eliminated.

Another and more specific object of the present invention is to provide an alarm detection apparatus which can appropriately detect and/or cancel the alarm by use of a simple construction.

Still another object of the present invention is to provide an alarm detection apparatus comprising a plurality of alarm detectors detecting and/or cancelling alarms for identical and different error rates, where the plurality of alarm detectors are grouped into a major detector unit made up of alarm detectors which detect major error rates and a minor detector unit made up of alarm detectors which detect minor error rates, the major detector unit and the minor detector unit output detection outputs corresponding to specified detection rates thereof, and a predetermined alarm detector corresponding to a part of the minor detector unit has a specified detection rate overlapping a specified detection rate of the major detector unit being controlled, so that a detection function or a detection output of the predetermined alarm detector is disabled. According to the alarm detection apparatus of the present invention, it is possible to effectively avoid an undesirable situation where the alarm detection and/or cancel signals are output from the major and minor detector units at different timings for the overlapping detection rates. In addition, it is also possible to effectively avoid a contradictory situation where the alarm detection and/or cancel signal output from the minor detector unit is for a detection rate higher than that for the major detector unit.

A further object of the present invention is to provide an alarm detection apparatus comprising a plurality of alarm detectors detecting and/or cancelling alarms for different error rates, and means, responsive to an alarm detection in an arbitrary alarm detector of the plurality of alarm detectors, for forcibly setting an alarm detection output of each of the plurality of alarm detectors which detect error rates smaller than that detected by the arbitrary alarm detector, where each of the alarm detectors starts a detection period for an alarm cancel detection thereof in synchronism with a detection of an alarm cancellation in an alarm detector which detects an error rate one level higher than an error rate detected thereby. According to the alarm detection apparatus of the present invention, no overlap of the alarm cancel detection periods occur between the alarm detectors. Hence, it is possible to effectively avoid an undesirable situation where the same error signal is counted by both two alarm detectors within the respective alarm cancel detection periods. As a result, it is possible to effectively avoid a situation where the alarm cancel detection is unnecessarily extended as was the case of the conventional alarm detection apparatus.

Another object of the present invention is to provide an alarm detection apparatus comprising a plurality of alarm detectors detecting alarms for different error rates, where each of the plurality of alarm detectors detects an alarm of its own detection rate depending on an input timing signal and outputting a timing signal having a period which is n times a period of the input timing signal, and the plurality of alarm detectors are successively coupled in a cascade connection so that a timing signal output from one alarm detector is input to another alarm detector provided in a next stage. According to the alarm detection apparatus of the present invention, it is possible to greatly reduce the circuit scale of a timing generating circuit within each alarm detector, and the circuit scale of the alarm detection apparatus as a whole is greatly reduced. In addition, since the same circuit construction can basically be used for the alarm detectors, the construction of the alarm detection apparatus becomes simple and easy to design, thereby making it possible to reduce the cost of the alarm detection apparatus.

Still another object of the present invention is to provide an alarm detection apparatus comprising a timing generator generating a plurality of kinds of timing signals required to detect and/or cancel alarms of different error rates based on a pulse signal having a basic period, a plurality of alarm detectors detecting and/or cancelling alarms for different alarms, each of the plurality of alarm detectors detecting and/or cancelling an alarm depending on a detection rate thereof based on an input timing signal, and a timing selector, interposed between the timing generator and the plurality of alarm detectors, distributing the plurality of kinds of timing signals from the timing generator to the plurality of alarm detectors, where the timing selector supplies an alarm detection timing signal with respect to a corresponding alarm detector when no alarm is detected by the corresponding alarm detector, and supplies an alarm cancel detection timing signal with respect to the corresponding alarm detector when an alarm is detected by the corresponding alarm detector. According to the alarm detection apparatus of the present invention, it is possible to simplify the circuit construction because the circuit parts are separated depending on the primary functions. Further, the timing generator can generate the timing signals with periods of freely variable multiplication factors relative to the period of the input timing signal, and select the desired alarm detection timing signal and alarm cancel detection timing signal from these timing signals and supply these signals to the alarm detector. Therefore, it is possible to easily construct a flexible alarm detection apparatus in terms of the various alarm detection and/or cancellation conditions to be satisfied.

Other objects and further features of the present invention will be apparent from the following detailed description when read in conjunction with the accompanying drawings.

BRIEF DESCRIPTION OF THE DRAWINGS

FIG. 3 is a diagram showing various kinds of setting information for making the alarm detection and/or cancellation;

DESCRIPTION OF THE PREFERRED EMBODIMENTS

First, a description will be given of the operating principle of the present invention, by referring to FIG. 7.

Figure 7:
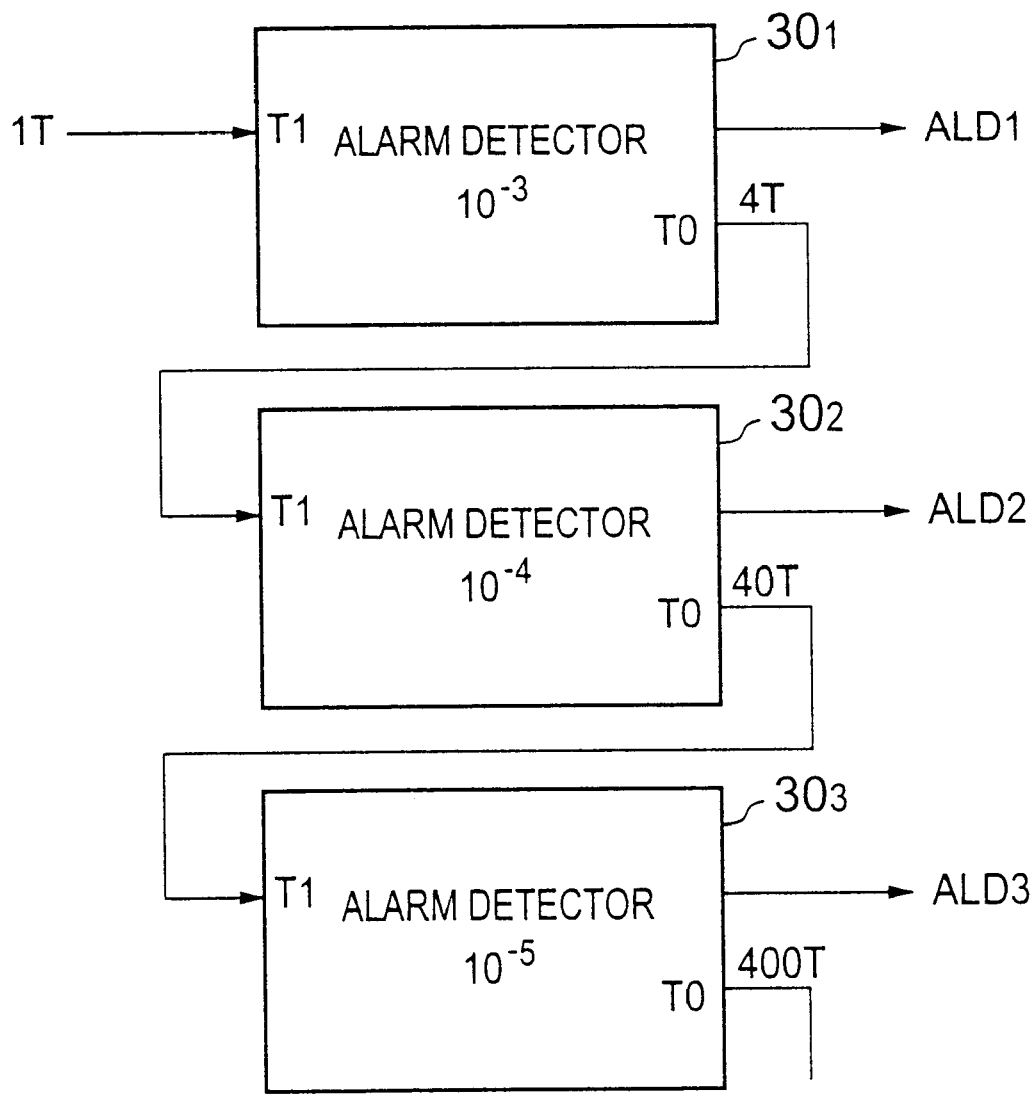
FIG. 7 is a system block diagram for explaining the operating principle of the present invention.

An alarm detection apparatus shown in FIG. 7 includes a plurality of alarm detectors 30. For the sake of convenience, only three alarm detectors $30_1$ through $30_3$ are shown in FIG. 7. Each of the alarm detectors $30_1$ through $30_3$ makes an alarm detection with its own detection rate depending on an input timing signal TI, and generates and outputs a timing signal TO having a period which is n times that of the input timing signal TI based on the input timing signal TI, where n is an arbitrary integer. The alarm detectors $30_1$ through $30_3$ are successively connected in a cascade connection, so that the output timing signal TO of one alarm detector 30 is input to another alarm detector 30 in a next stage as the input timing signal TI. Hence, each of the alarm detectors $30_1$ through $30_3$ makes the alarm detection with respect to a different error rate.

In this case, each of the alarm detectors $30_1$ through $30_3$ only needs to generate an output timing signal TO having a period which is at a maximum only about 10 times that of an input timing signal TI input thereto. For example, with respect to the input timing signal TI having the period 1T, the periods of the output timing signals TO of the alarm detectors $30_1$ through $30_3$ respectively are 4T, 40T and 400T.

For this reason, the scale of the timing generation circuit or counter circuit within each of the alarm detectors $30_1$ through $30_3$ is greatly reduced, thereby making it possible to greatly reduce the circuit scale of the alarm detection apparatus as a whole. In addition, since the same circuit construction can be used for each of the alarm detectors $30_1$ through $30_3$, the construction of the alarm detection apparatus becomes simple and easy to design, and as a result, the cost of the alarm detection apparatus can be reduced.

Figure 4:
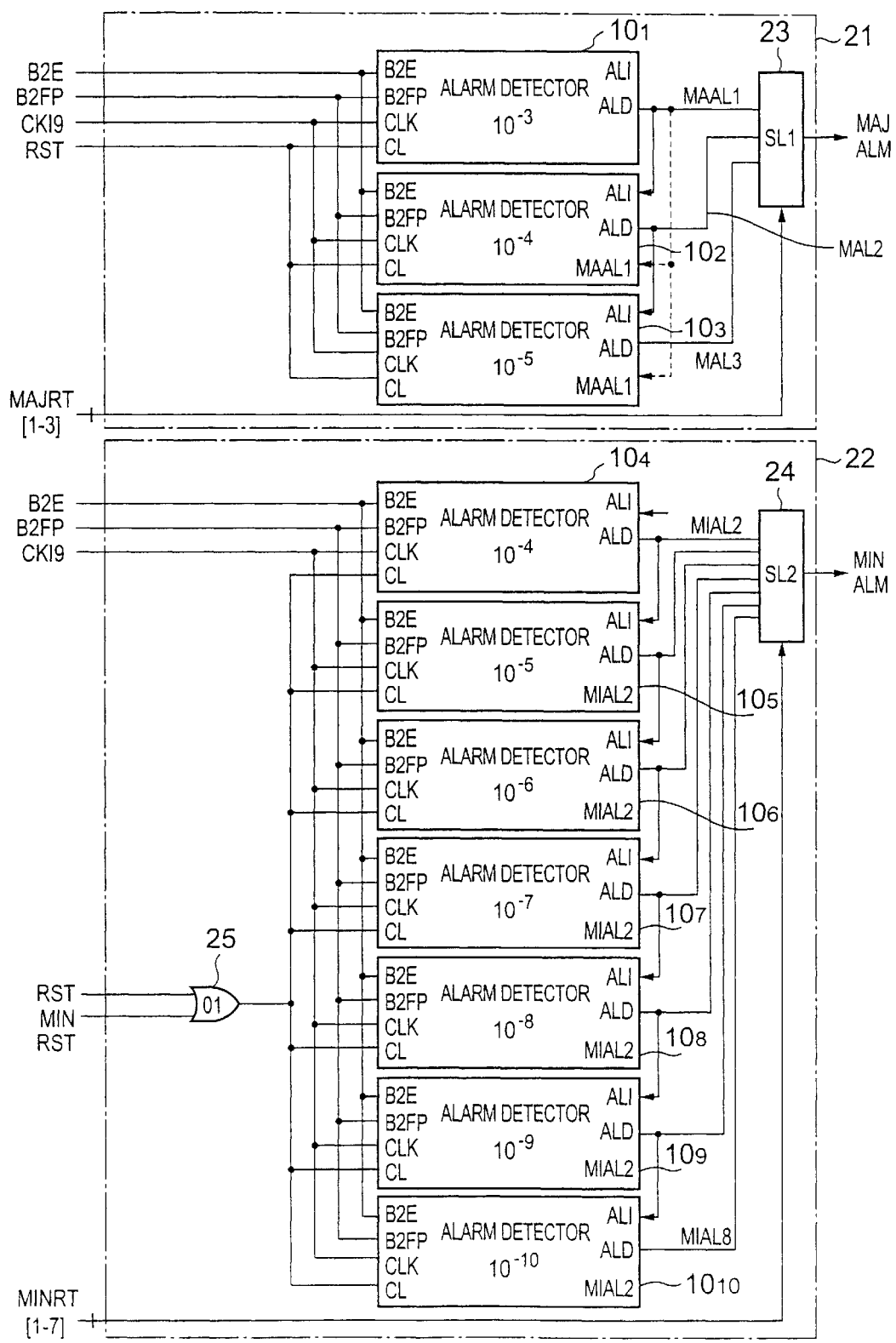
FIG. 4 is a system block diagram showing a conventional alarm detection apparatus.
Figure 8:
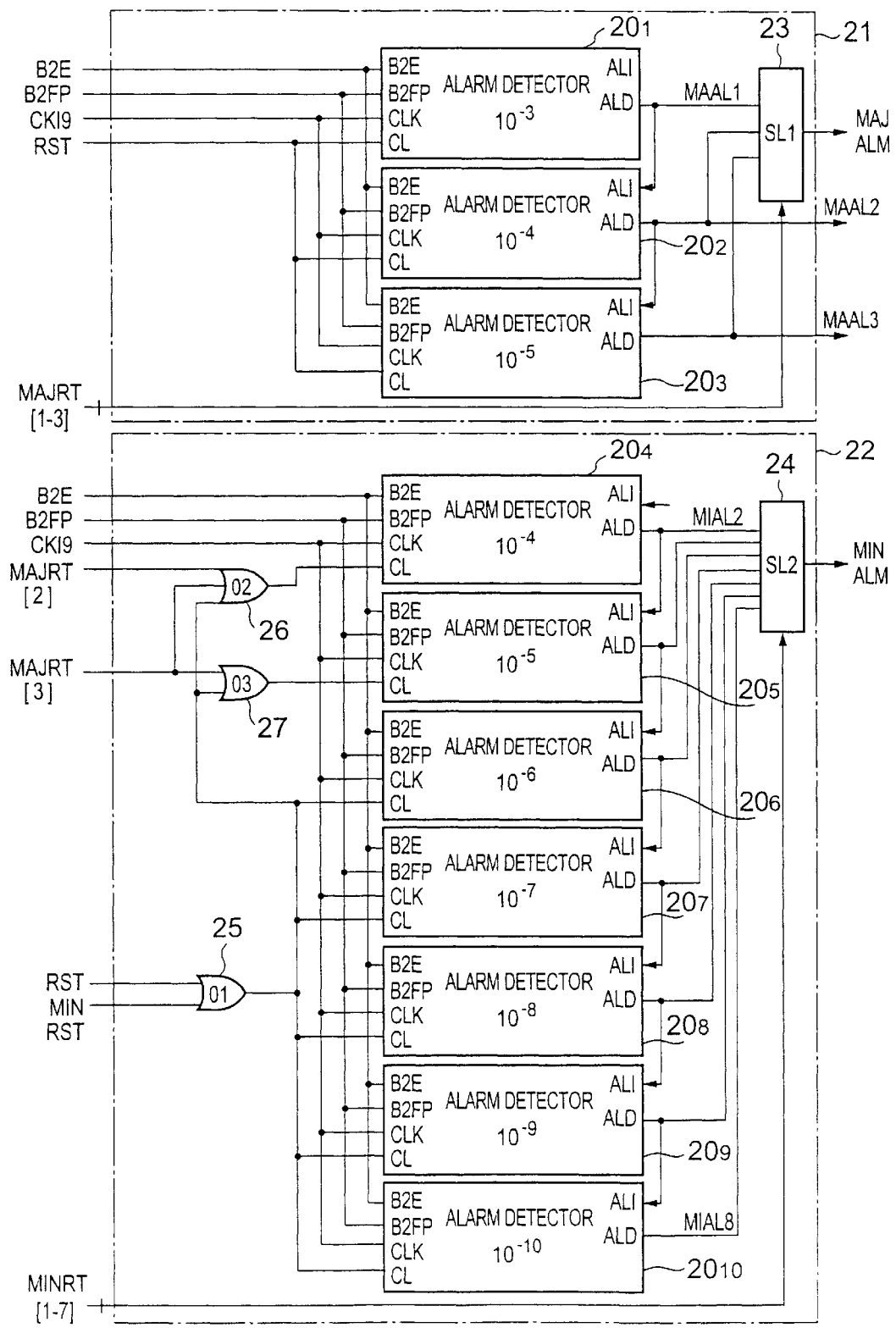
FIG. 8 is a system block diagram showing a first embodiment of an alarm detection apparatus according to the present invention.

Next, a description will be given of a first embodiment of the alarm detection apparatus according to the present invention. FIG. 8 is a system block diagram showing the first embodiment of the alarm detection apparatus. In FIG. 8, those parts which are the same as those corresponding parts in FIG. 4 are designated by the same reference numerals, and a description thereof will be omitted.

In FIG. 8, a major detector unit 21 includes alarm detectors $20_1$ through $20_3$ and a selector (SL1) 23 which are connected as shown, and a minor detector unit 22 includes alarm detectors $20_4$ through $20_{10}$, a selector (SL2) 24, and OR gate circuits (O1, O2 and O3) 25, 26 and 27 which are connected as shown. Each of the alarm detectors $20_1$ through $20_{10}$ has a construction which is basically the same as that of the alarm detector 10 shown in FIG. 2 described above.

This embodiment is characterized in that, when overlapping error rates such as $10^{-4}$ and $10^{-5}$ are detected between the major detector unit 21 and the minor detector unit 22, for example, the detection made in the major detector unit 21 is given priority over the detection made in the minor detector unit 22, and the detection in the minor detector unit 22 is deactivated. As a result, it is possible to effectively avoid an undesirable situation where the alarm detection and/or cancellation signals MAJALM and MINALM are output at different timings from the major detector unit 21 and the minor detector unit 22 with respect to the same error rate.

The detection in the minor detector unit 22 can be deactivated by various methods. According to one method, the function of the alarm detector $20_4$ is reset by the major selection signal MAJRT[2]=1, and the functions of the alarm detectors $20_4$ and $20_5$ are reset by the major selection signal MAJRT[3]=1, as shown in FIG. 8.

On the other hand, according to another method, the alarm detection signal MIAL2 from the alarm detector $20_4$ is turned OFF at the input side of the selector (SL2) 24 by the major selection signal MAJRT[2]=1, and the alarm detection signals MIAL2 and MIAL3 from the alarm detectors $20_4$ and $20_5$ are turned OFF at the input side of the selector (SL2) 24 by the major selection signal MAJRT[3]=1, although not shown in FIG. 8. According to this latter method, the alarm detectors $20_4$ and $20_5$ can operate normally, so that the minor detector unit 22 as a whole can operate normally.

Figure 1:
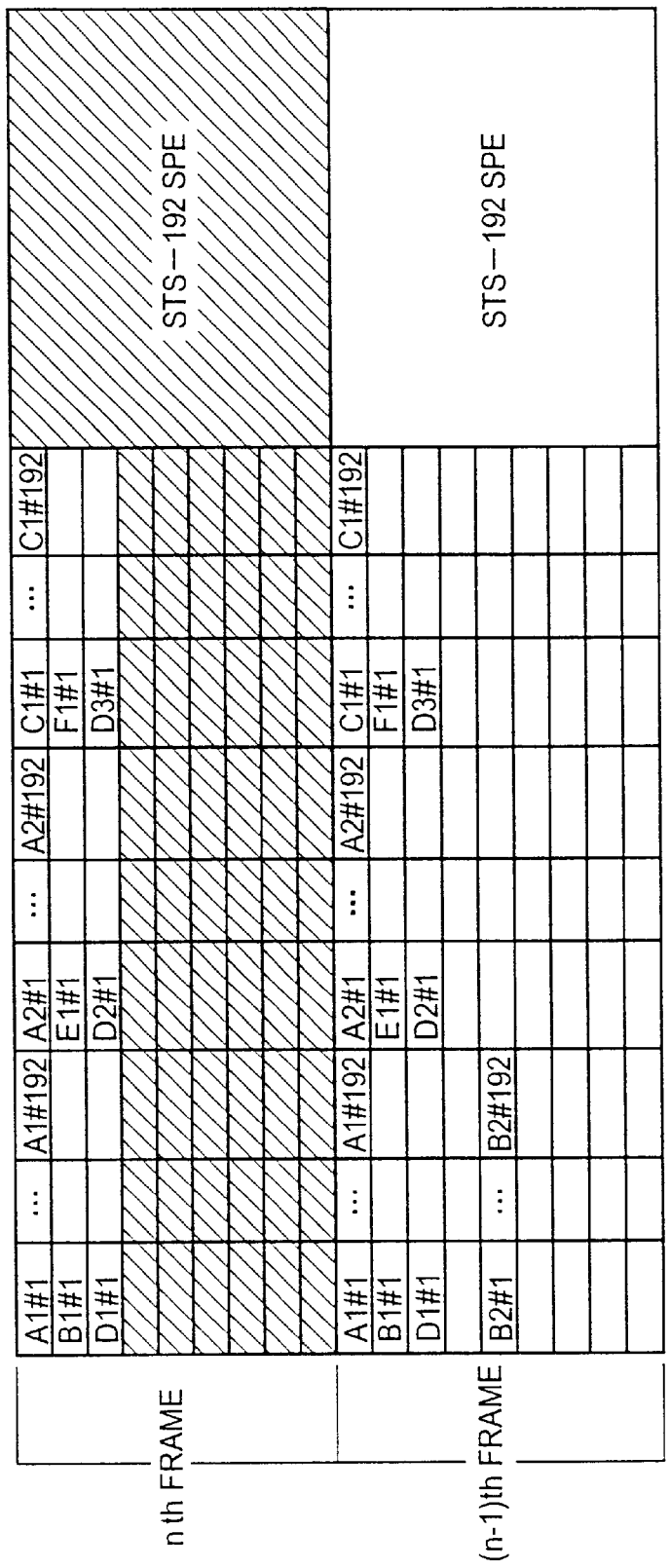
FIG. 1 is a diagram showing a frame format of a SONET Synchronous Transport Signal-N (STS-N) for a case where N=192.
Figure 2:
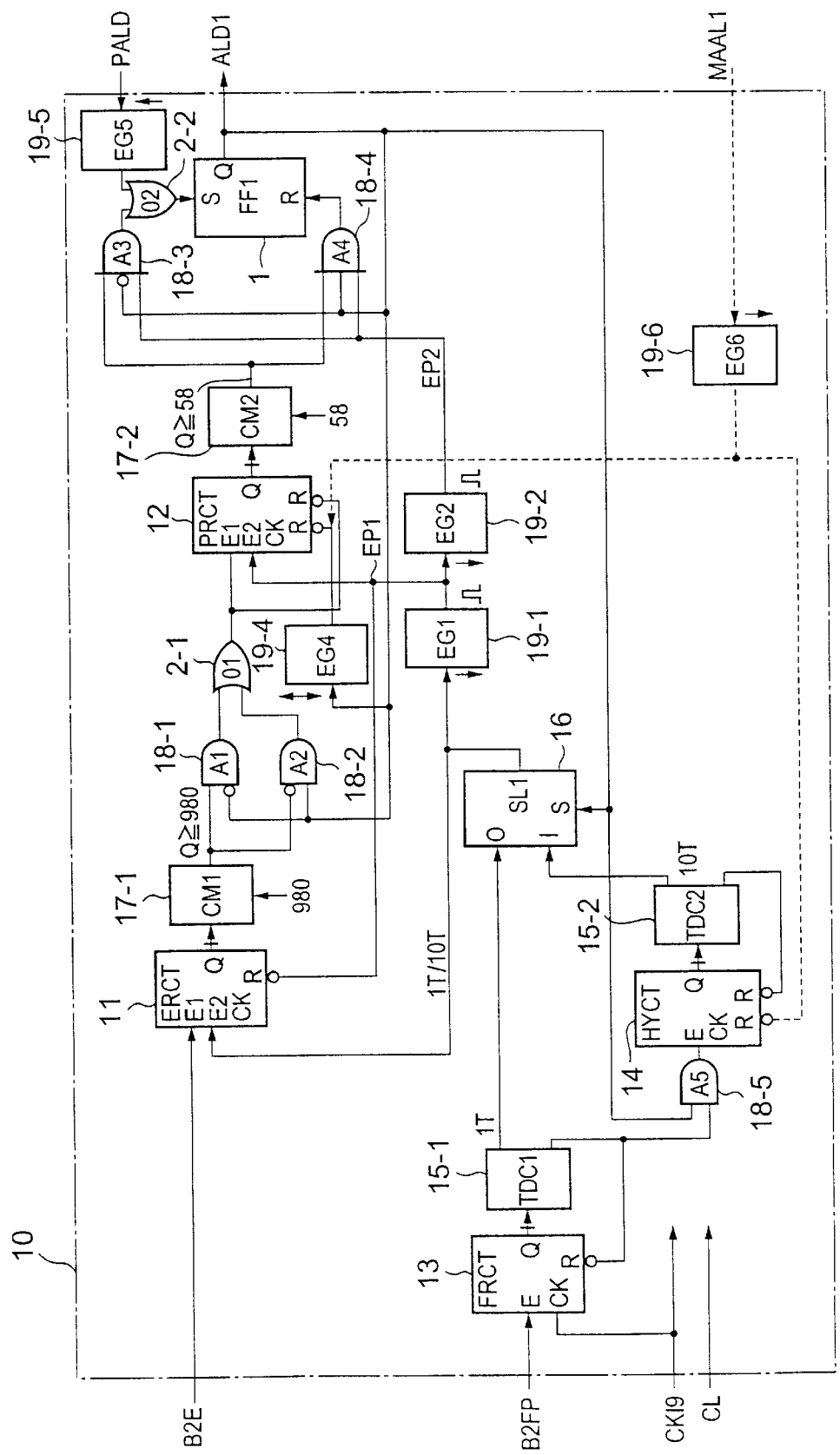
FIG. 2 is a system block diagram showing a conventional alarm detector.

Of course, the application of the above described features is not limited to this embodiment, and similar applications can be made with respect to each of the following embodiments and also to the conventional alarm detection apparatus shown in FIG. 2.

Furthermore, this embodiment is also characterized in that, the alarm detector 20 provided at each stage starts the detection period for its own alarm cancellation in phase synchronism with the alarm cancel detection in an alarm detector 20 provided at a preceding stage, that is, in a level which is one level more significant alarm detector 20.

Figure 9:
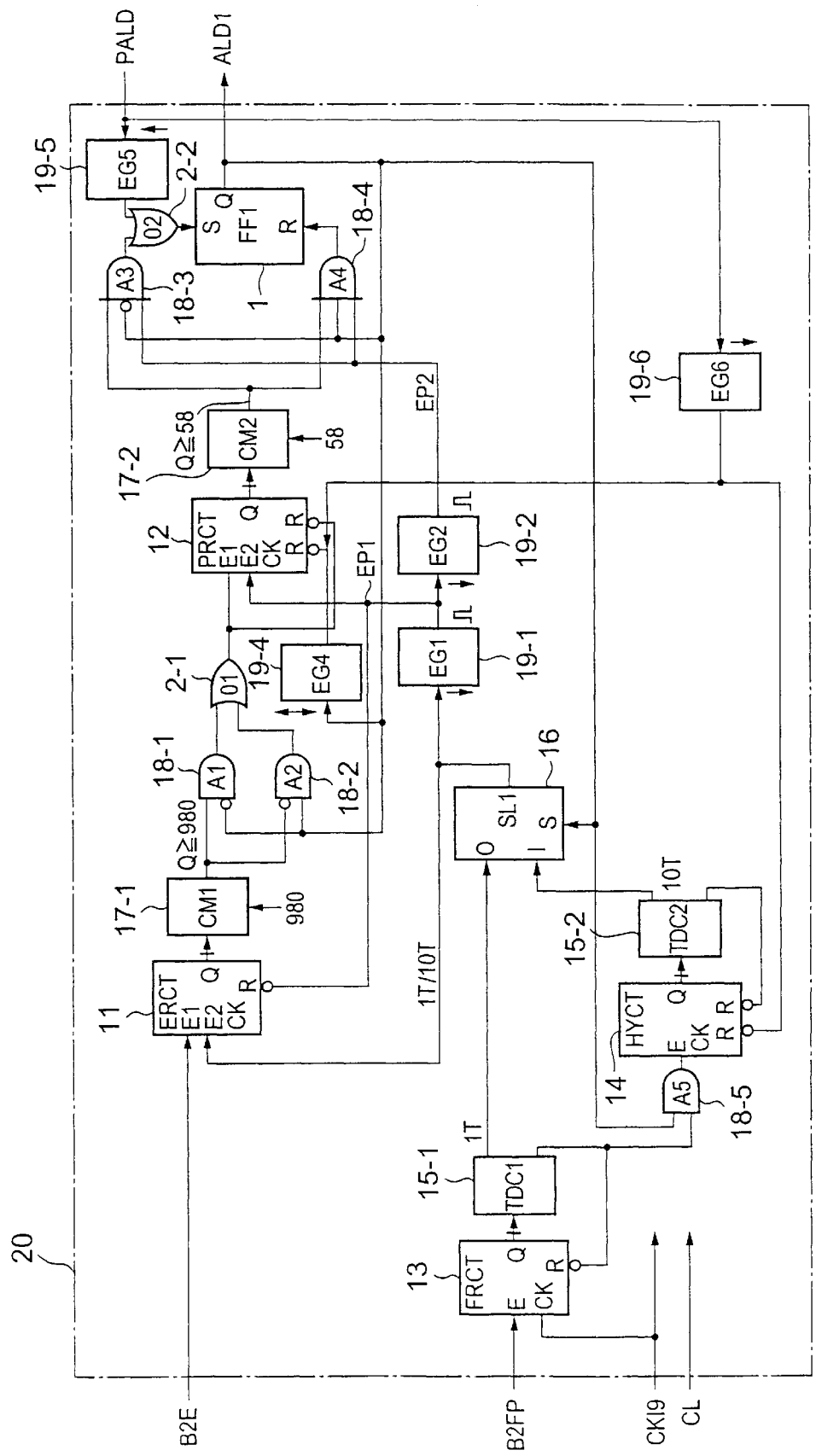
FIG. 9 is a system block diagram showing an alarm detector of the first embodiment of the alarm detection apparatus.

A more detailed description will be given of this latter characteristic of this embodiment, by referring to FIG. 9. FIG. 9 is a system block diagram showing the alarm detector 20 of this embodiment. In FIG. 9, those parts which are the same as those corresponding parts in FIG. 2 are designated by the same reference numerals, and a description thereof will be omitted.

The basic construction of the alarm detector 20 shown in FIG. 9 is similar to that of the conventional alarm detector 10 shown in FIG. 2. However, in FIG. 9, the edge detection circuit (EG6) 19-6 does not receive the alarm detection signal MAAL1 or MIAL2 of the most significant error rate as is the case of the conventional alarm detector 10, but instead receives an alarm detection signal PALD detected and/or cancelled by an alarm detector 20 which is provided at a preceding stage, that is, in an alarm detector 20 which is provided in a level which is one level more significant. Hence, the edge detection circuit (EG6) 19-6 of each alarm detector 20 outputs a pulse signal by detecting a falling edge (alarm cancellation) of the alarm detection signal PALD of an immediately preceding stage (that is, from an alarm detector 20 in a level which is one level more significant), and resets (initializes) the detection phase of its own alarm cancel detection. Hence, the hysteresis counter 14 and the protection counter 12 of the alarm detector 20 are reset.

Figure 10:
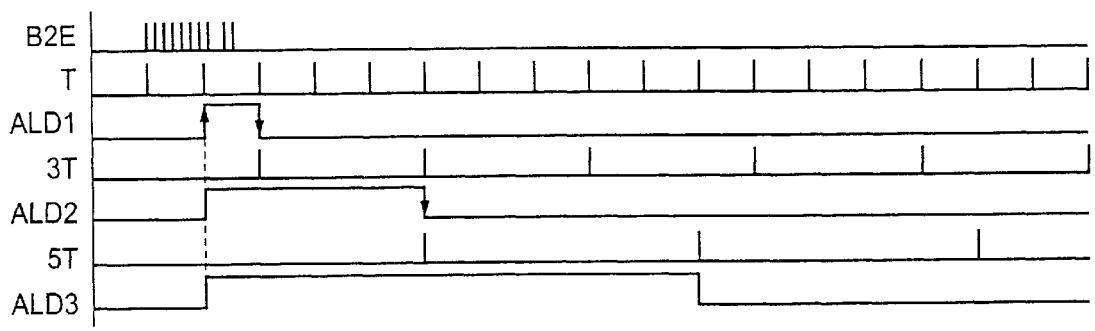
FIG. 10 is a timing chart for explaining the operation of the first embodiment of the alarm detection apparatus for a case where an error B2E generated at a high density disappears quickly.
Figure 11:
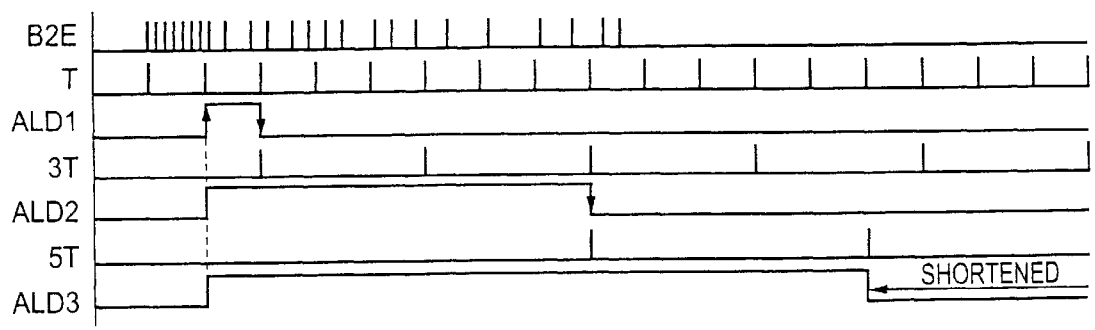
FIG. 11 is a timing chart for explaining the operation of the first embodiment of the alarm detection apparatus for a case where the error B2E generated at a high density gradually reduces its generation rate and disappears.

FIGS. 10 and 11 are timing charts for explaining the operation of this embodiment of the alarm detection apparatus. In FIGS. 10 and 11, it is assumed for the sake of convenience that the detection period is 1T, 3T and 5T in the most significant order, and that no hysteresis control is carried out for the alarm cancel detection, as in the case of the timing charts shown in FIGS. 5 and 6.

FIG. 10 shows a case where an error B2E generated at a high density disappears quickly. The most significant alarm signal ALD1 is quickly set by the generation of the high density burst error, and the less significant alarm signals ALD2 and ALD3 are simultaneously set forcibly in response to the setting of the most significant alarm signal ALD1. Next, when the most significant alarm signal ALD1 is reset (cancelled) due to a rapid decrease of the error generation density, the phase of the alarm cancel detection timing signal 3T in a level which is one level less significant than the alarm signal ALD1 is synchronized to the cancellation timing of the alarm signal ALD1. In addition, the alarm signal ALD2 is cancelled at a timing 3T after the cancellation of the alarm signal ALD1, and the phase of the alarm cancel detection timing signal 5T in a level which is one level less significant than the alarm signal ALD2 is synchronized to the cancellation timing of the alarm signal ALD2. Furthermore, the alarm signal ALD3 is cancelled at a timing 5T after the cancellation of the alarm signal ALD2. Hence, in this particular case, the alarm cancel detection of the alarm signals ALD1, ALD2 and ALD3 occurs with a regularity of 1T, 3T thereafter, and 5T thereafter, reflecting the instantaneous disappearance of the error signal B2E.

On the other hand, FIG. 11 shows a case where the error B2E generated at a high density gradually reduces its generation rate and disappears. The most significant alarm signal ALD1 is quickly set by the generation of the high density burst error, and is reset as the density thereafter decreases. With respect to the alarm signal ALD2, the alarm cancel detection thereof is started in phase synchronism with the cancellation timing of the most significant alarm signal ALD1. However, the error density is greater than or equal to a first predetermined value in the first 3T interval and the alarm signal ALD2 is not reset in this first 3T interval, and is finally reset in the second 3T interval. With respect to the alarm signal ALD3, the alarm cancel detection thereof is started in phase synchronism with the cancellation timing of the alarm signal ALD2, and the alarm signal ALD3 is reset in a first 5T interval. Accordingly, in this particular case, the alarm cancel detection of the alarm signals ALD1, ALD2 and ALD3 occurs with a regularity of 1T, 2×3T thereafter, and 5T thereafter, reflecting the gradual disappearance of the error signal B2E.

Figure 5:
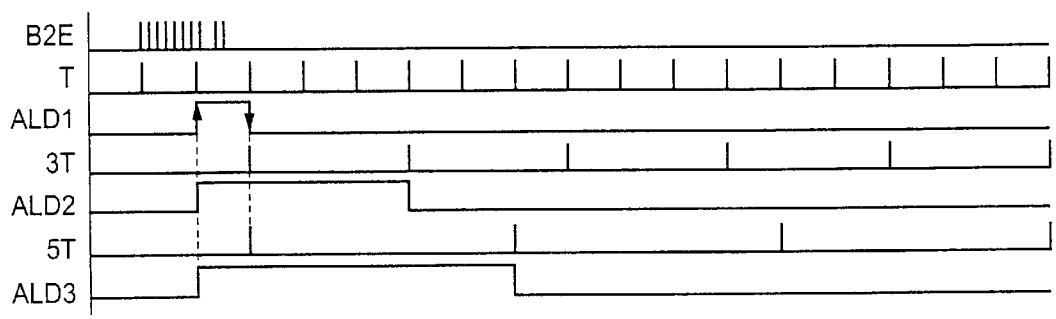
FIG. 5 is a timing chart for explaining the operation of the conventional alarm detection apparatus for a case where an error B2E generated at a high density disappears quickly.
Figure 6:
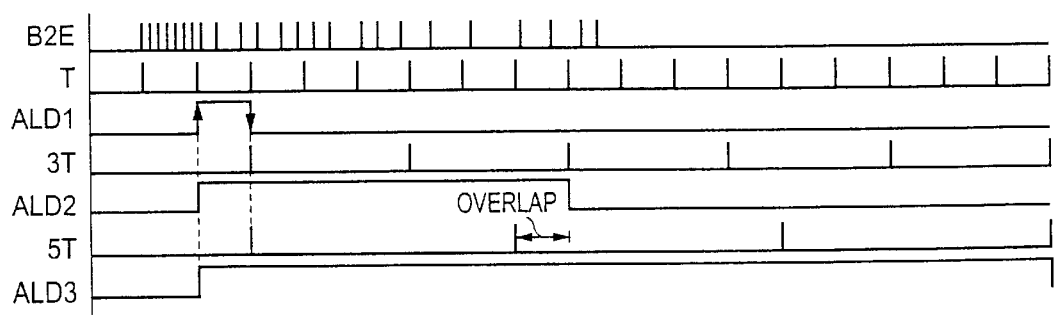
FIG. 6 is a timing chart for explaining the operation of the conventional alarm detection apparatus for a case where the error B2E generated at a high density gradually reduces its generation rate and disappears.

When the time charts shown in FIGS. 10 and 11 for this embodiment are compared with the time charts shown in FIGS. 5 and 6 for the conventional case, it may be seen that this embodiment can reduce the cancellation timing of the least significant alarm signal ALD3 by 4T compared to the conventional case. This reduction in the cancellation timing of the alarm signal ALD3 is realized because the alarm cancel detection timing signals 3T and 5T do not overlap, and double counting of the same error signal B2E by the two is avoided. Therefore, it is possible to effectively avoid a situation where the alarm cancellation times of the less significant alarm signals unstably become longer or shorter depending on the disappearing state of the error signal B2E as is the case of the conventional alarm detection apparatus, and this embodiment can realize an alarm detection apparatus having an improved response.

Figure 12:
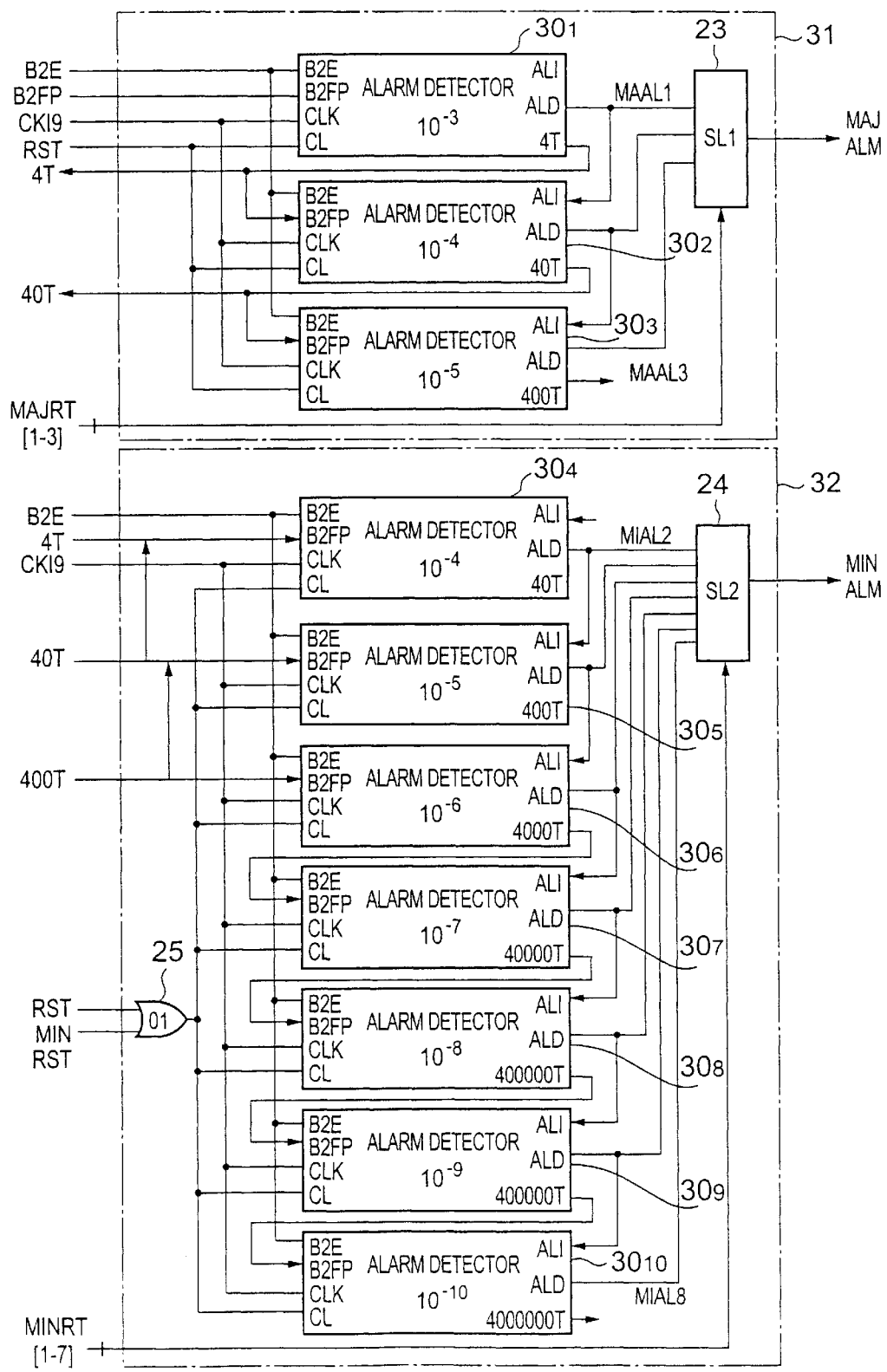
FIG. 12 is a system block diagram showing a second embodiment of the alarm detection apparatus according to the present invention.

FIG. 12 is a system block diagram showing a second embodiment of the alarm detection apparatus according to the present invention. In FIG. 12, those parts which are the same as those corresponding parts in FIG. 4 are designated by the same reference numerals, and a description thereof will be omitted.

In FIG. 12, each of alarm detectors $30_1$ through $30_{10}$ is only provided with a single timing counter which corresponds to the hysteresis counter 14, for example. The alarm detectors $30_1$ through $30_3$ are connected in a cascade connection within a major detector unit 31, and the alarm detectors $30_4$ through $30_{10}$ are connected in a cascade connection within a minor detector unit 32. The alarm detectors $30_1$ through $30_{10}$ efficiently generate timing signals 1T, 10T, 4T, 40T, 400T, 4000T and the like having various kinds of periods required for the alarm detection and/or cancellation. For example, the alarm detector $30_1$ generates the timing signals 4T and 10T from the input timing signal 1T, and uses the timing signal 1T for the alarm detection and the timing signal 10T for the alarm cancel detection. On the other hand, alarm detector $30_2$ generates a timing signal 40T from the input timing signal 4T, and uses the timing signal 4T for the alarm detection and the timing signal 40T for the alarm cancel detection. Accordingly, the circuit scale of the counters and the alarm detection apparatus as a whole is greatly reduced in this embodiment.

The internal construction of each of the alarm detectors $30_1$ through $30_{10}$ of this embodiment shown in FIG. 12 will be described later. In the major detector unit 31, the alarm detector $30_1$ inputs the frame pulse B2FP corresponding to the timing signal 1T and uses this timing signal 1T for the alarm detection thereof, and also generates the timing signal 4T having a period which is 4 times the period of the timing signal 1T by use of an internal counter and outputs this timing signal 4T. The alarm detector $30_1$ also internally generates the timing signal 10T having a period which is 10 times the period of the timing signal 1T and uses this timing signal 10T for the alarm cancel detection thereof. The alarm detector $30_2$ inputs the timing signal 4T from the alarm detector $30_1$ and uses this timing signal 4T for the alarm detection thereof. The alarm detector $30_2$ also generates the timing signal 40T having a period which is 10 times the period of the timing signal 4T by use of an internal counter and uses this timing signal 40T for the alarm cancel detection thereof. The alarm detector $30_3$ inputs the timing signal 40T from the alarm detector $30_2$ and uses this timing signal 40T for the alarm detection thereof, and also generates the timing signal 400T having a period which is 10 times the period of the timing signal 40T. The alarm detector $30_3$ uses the timing signal 400T for the alarm cancel detection thereof, and outputs this timing signal 400T.

The minor detector unit 32 operates similarly to the major detector unit 31. But in the minor detector unit 32, the alarm detectors $30_4$ through $30_6$ obtain the input timing signals 4T through 400T from the alarm detectors $30_1$ through $30_3$ of the major detector unit 31. For this reason, internal counters may be omitted in the alarm detectors $30_4$ and $30_5$. In other words, the timing signals may be mutually used between the major and minor detector units 31 and 32 for parts where the detection rates overlap, thereby enabling a further reduction in the circuit scale of the counter circuit. In the minor detector unit 32, the alarm detector $30_6$ inputs the timing signal 400T and uses this timing signal 400T for the alarm detection thereof. In addition, the alarm detector $30_6$ generates a timing signal 4000T having a period which is 10 times the period of the timing signal 400T by use of an internal counter, and uses this timing signal 4000T for the alarm cancel detection thereof. The alarm detector $30_7$ inputs the timing signal 4000T from the alarm detector $30_6$ and uses this timing signal 4000T for the alarm detection thereof. The alarm detector $30_7$ also generates a timing signal 40000T having a period which is 10 times the period of the timing signal 4000T by use of an internal counter, and uses this timing signal 40000T for the alarm cancel detection thereof. The timing signal 40000T from the alarm detector $30_7$ is input to the next alarm detector $30_8$, and similar operations are carried out by the alarm detectors $30_8$ through $30_{10}$. Accordingly, each internal counter used by the alarm detectors $30_4$ through $30_{10}$ only needs to make a count on the order of 10-count, and the circuit scale of the counter circuit can greatly be reduced. In addition, since the circuit construction used for the alarm detectors $30_1$ through $30_3$ of the major detector unit 31 can be used in common for the alarm detectors $30_4$ through $30_{10}$ of the minor detector unit 32, it is possible to realize an alarm detection apparatus having an arbitrary number of stages at a low cost.

Figure 13:
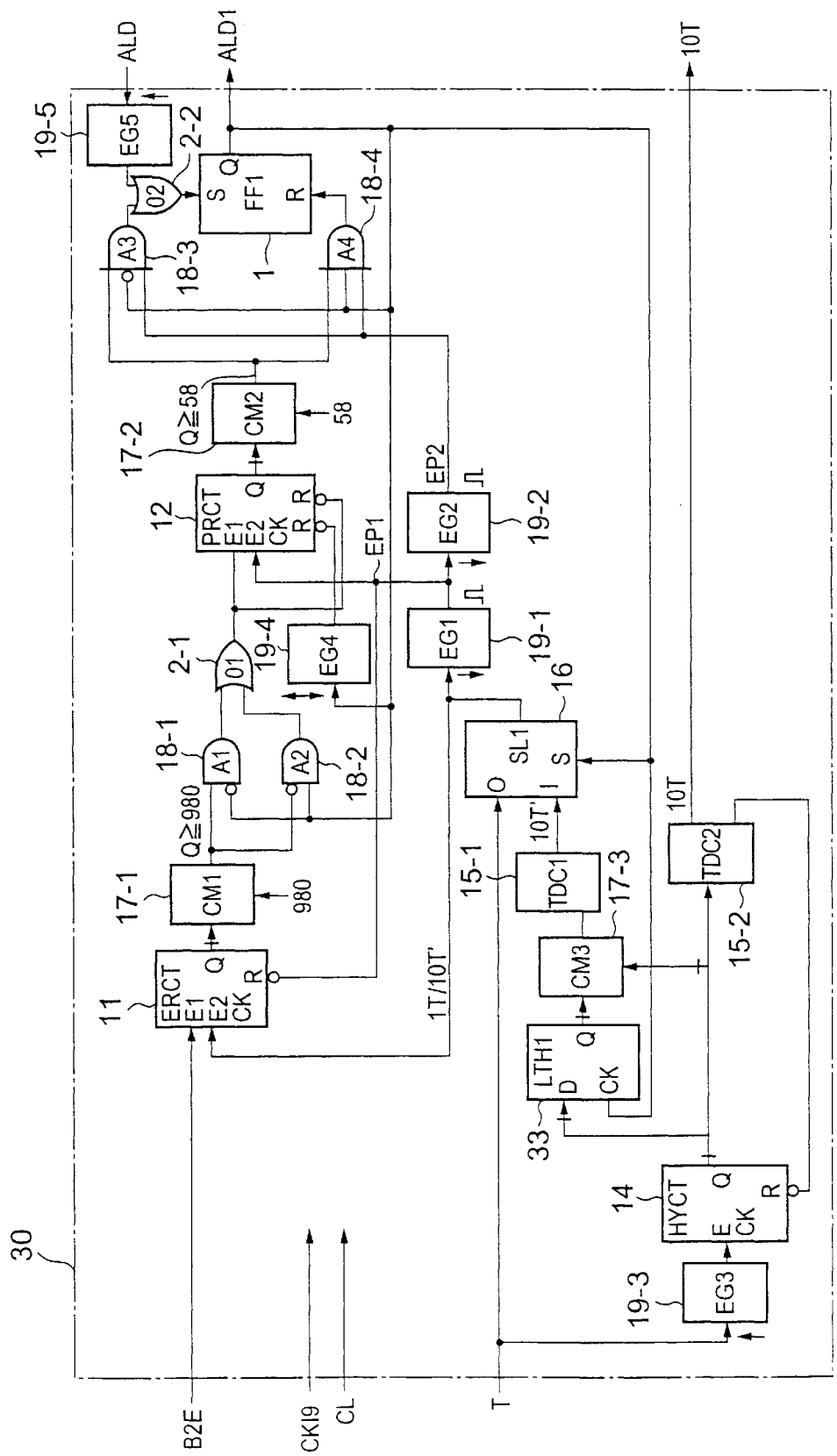
FIG. 13 is a system block diagram showing an alarm detector of the second embodiment of the alarm detection apparatus.

FIG. 13 is a system block diagram showing a typical construction of the alarm detector 30 of this embodiment. The construction shown in FIG. 13 may be used in common for each of the alarm detectors $30_1$ through $30_{10}$ shown in FIG. 12. In FIG. 13, those parts which are the same as those corresponding parts in FIG. 9 are designated by the same reference numerals, and a description thereof will be omitted. More particularly, an upper half portion of the alarm detector 30 shown in FIG. 13 related to the alarm detection and/or cancel control may be the same as a corresponding part of the alarm detector 20 shown in FIG. 9. However, in FIG. 13, one of the timing signals input to the selector (SL1) 16, that is, the alarm detection timing signal, is the timing signal 1T itself. Furthermore, in FIG. 13, the other of the timing signals input to the selector (SL1) 16, that is, the alarm cancel detection timing signal, is a timing signal 10T which is generated based on a counter output Q of the hysteresis counter 14.

A description will be given of a lower half portion of the alarm detector 30 shown in FIG. 13 related to the timing generation. The lower half portion of the alarm detector 30 includes an edge detection circuit (EG3) 19-3, the hysteresis counter 14, a latch circuit (LTH1) 33, a comparator (CM3) 17-3, the timing decoders (TDC1 and TDC2) 15-1 and 15-2, and the selector (SL1) 16 which are connected as shown.

The edge detection circuit (EG3) 19-3 detects rising edges of the input timing signal T, such as the timing signals 1T, 4T and 40T, and outputs an edge pulse signal. The hysteresis counter 14 counts this edge pulse signal, and cooperates with the timing decoder (TDC2) 15-2 so as to generate the timing signal 10T having a period which is 10 times the period of the input timing signal T. Hence, in the case where the input timing signal 1T is input to the alarm detector 30, a constant phase relationship is always maintained between this input timing signal 1T and the output timing signal 10T which is generated. Similarly, the constant phase relationship is always maintained between the input timing signal 10T (or 4T) and the output timing signal 100T (or 40T) which is generated in an alarm detector 30 provided at a next stage. Accordingly, this constant phase relationship is always maintained regardless of the alarm signal detection and/or cancellation in each alarm detector 30, and the alarm detector 30 in each stage can thus use the input and output timing signals 1T and 10T, for example, for the alarm detection and the alarm cancel detection thereof.

In the alarm detector 30, it is desirable that the alarm cancel detection period which is 10 times the period of the alarm detection starts immediately after the alarm detection, but it may not necessarily be the case. For example, in the case of the alarm detector $30_1$, the alarm detection signal ALDI becomes ALD1=1 when an error of $10^{-3}$ or greater occurs within each 1T period 58 consecutive times. In this case, if the alarm detector $30_1$ starts the count of the protection stage from the first 1T period, the counter output Q of the hysteresis counter 14 at the time of the alarm detection is "58" and the one's digit is "8" which is not an accurate multiple of 10. Accordingly, if the alarm cancel detection period is started immediately after the alarm detection when Q=58, the first alarm cancel detection period ends when the hysteresis counter 14 counts Q=9 and Q=10. In other words, the alarm cancel detection period in this case would be 8T shorter than the original alarm cancel detection period 10T. But this is merely one example, and in actual practice, the burst error signal B2E may occur at any count phase of the hysteresis counter 14, and the first alarm cancel detection period may vary arbitrarily in a range of 1T to 9T. Therefore, this second embodiment eliminates this problem of the varying first alarm cancel detection period by using the following construction.

That is, in this embodiment, the latch circuit (LTH1) 33 latches the counter output Q of the hysteresis counter 14 by a rising edge of its own alarm detection signal ALD1. The comparator (CM3) 17-3 compares the latched output of the latch circuit (LTH1) 33 and the counter output Q of the hysteresis counter 14, and outputs a match pulse signal when the two compared outputs match. The timing decoder (TDC1) 15-1 generates the timing signal 10T' which turns ON from the match pulse signal to a next match pulse signal. Accordingly, if the detection of the alarm signal ALD1=1 is made at the timing when the counter output Q of the hysteresis counter 14 is Q=8T as described above, the latch circuit (LTH1) 33 holds the value 8T, and the timing decoder (TDC1) 15-1 outputs a timing signal 10T' which turns ON from the time when the counter output Q of the hysteresis counter 14 is Q=8T to the next time when the counter output Q becomes Q=8T. As a result, it is possible to obtain an alarm cancel detection timing signal 10T' which is in phase synchronism with the detection of the alarm signal ALD1=1 and has a period 10T from the start.

Figure 14:
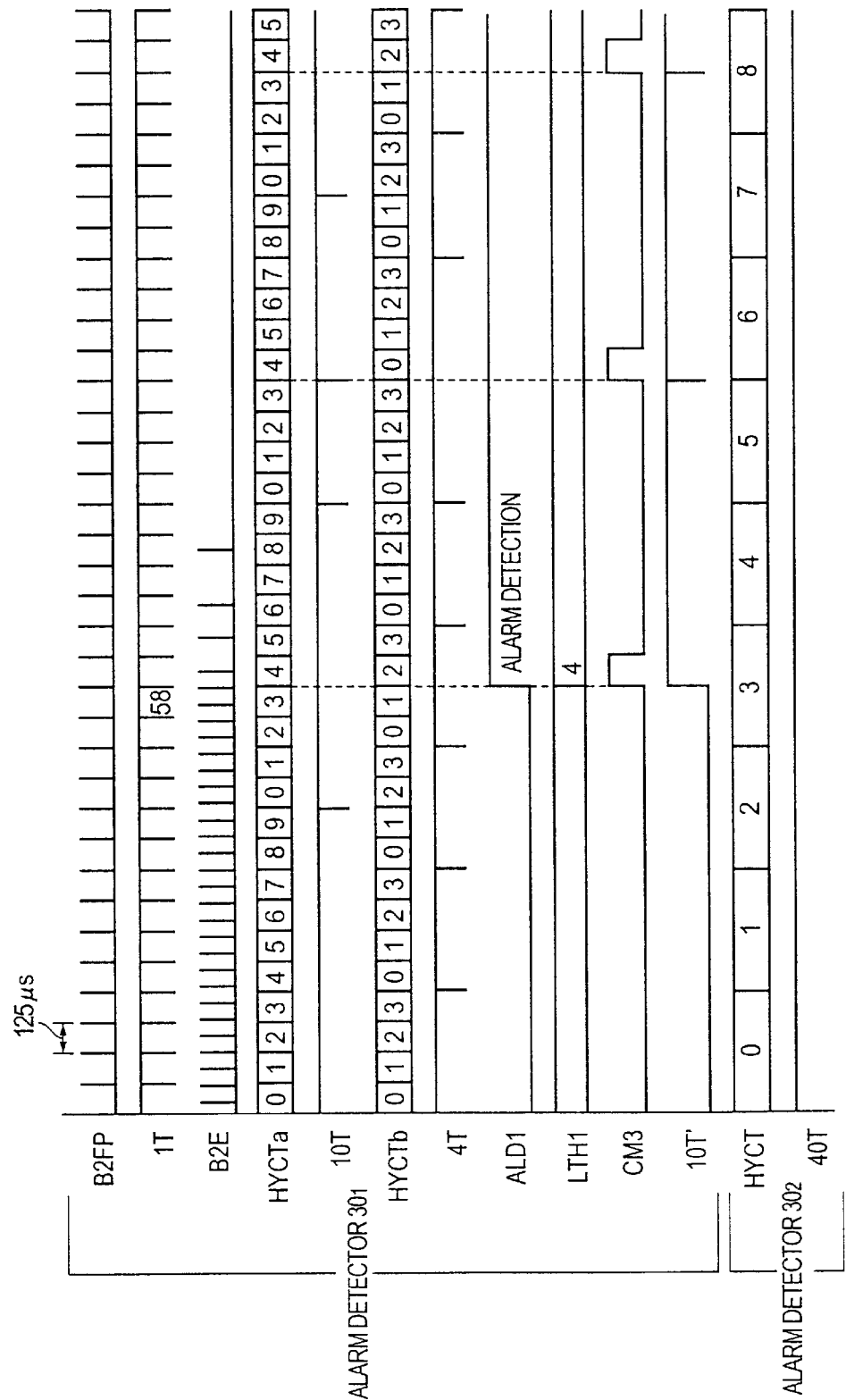
FIG. 14 is a timing chart for explaining the operation of the second embodiment of the alarm detection apparatus.

FIG. 14 is a timing chart for explaining the operation of the second embodiment of the alarm detection apparatus. More particularly, FIG. 14 shows the signal timings related to the alarm detectors $30_1$ and $30_2$. In the alarm detector $30_1$, the hysteresis counter (HYCTa) 14 generates the alarm cancel detection timing signal 10T based on the input timing signal 1T. In this particular case, the alarm detection period of the alarm detector $30_2$ in the next stage is 4T, and for this reason, although not shown in FIG. 13, another counter (HYCTb) is provided to generate the timing signal 4T which is supplied to the alarm detector $30_2$. The provision of this other counter (HYCTb) is peculiar to the alarm detector $30_1$, and it is unnecessary to provide the additional counter (HYCTb) in the other alarm detectors $30_2$ through $30_{10}$.

Furthermore, the alarm detector $30_1$ monitors the input error signal B2E in each 1T period, and outputs the alarm detection signal ALD1=1 at the 58th 1T of the consecutive 1Ts satisfying B2E≧980. The latch circuit (LTH1) 33 latches the counter output Q=4 of the hysteresis counter (HYCTa) 14 at this point in time, and the comparator (CM3) 17-3 compares the latched output 4 from the latch circuit (LTH1) 33 and the counter output Q of the threshold counter (HYCTa) 14. The comparator (CM3) 17-3 outputs the match signal every time the counter output Q of the threshold counter (HYCTa) 14 becomes Q=4. Hence, the alarm cancel detection timing signal 10T' in his case is generated at the phase shown in FIG. 14, and the detection period amounting to 10T can be secured from the start of the alarm cancel detection period.

Figure 15:
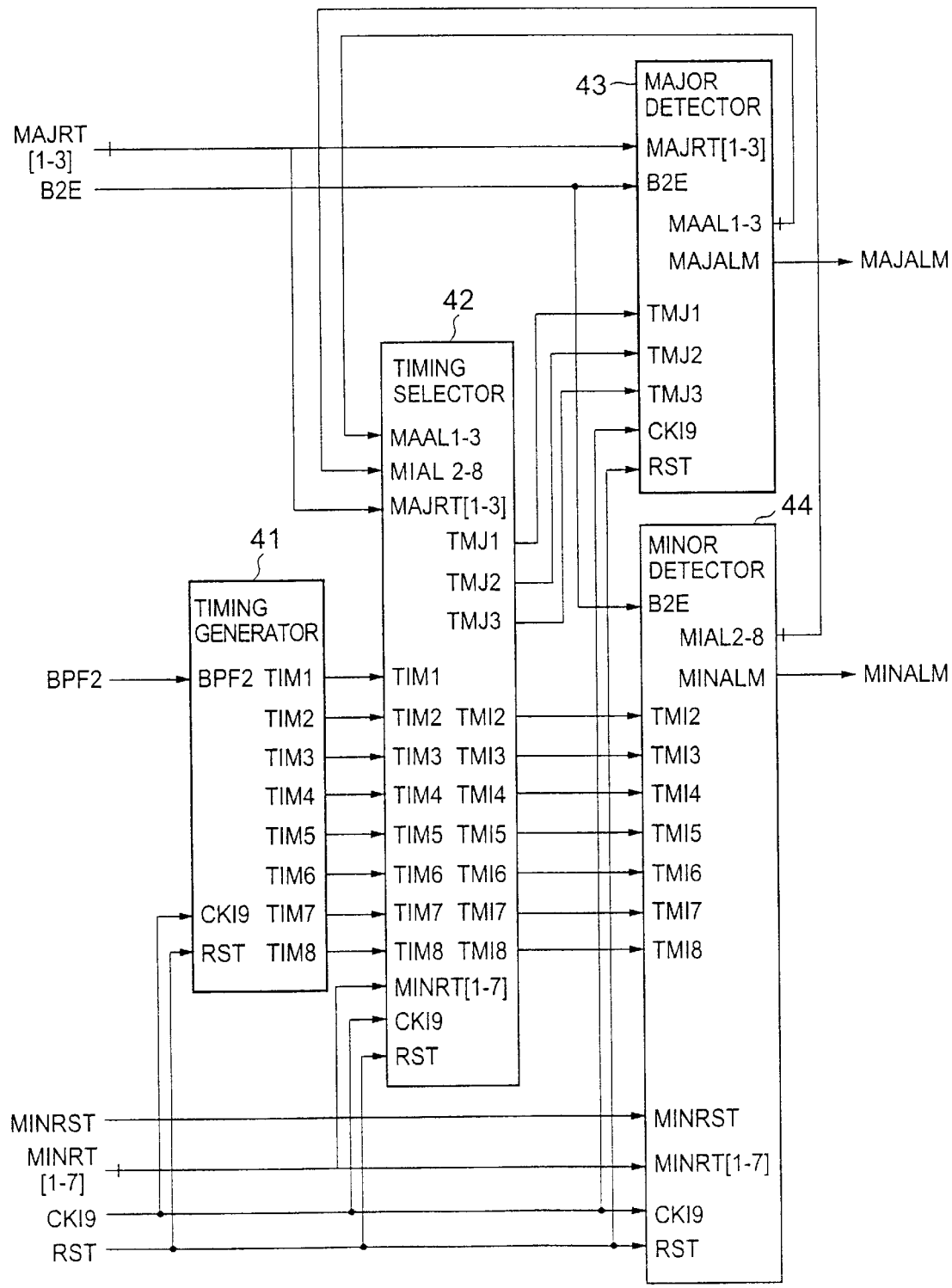
FIG. 15 is a system block diagram showing a third embodiment of the alarm detection apparatus according to the present invention.

FIG. 15 is a system block diagram showing a third embodiment of the alarm detection apparatus according to the present invention. In FIG. 15, those parts which are the same as those corresponding parts in FIG. 12 are designated by the same reference numerals, and a description thereof will be omitted. In this embodiment, the structure of the second embodiment of the alarm detection apparatus described above is efficiently divided depending on the primary functions and restructured.

In this embodiment, the alarm detection apparatus includes a timing generator 41, a timing selector 42, a major detector unit 43, and a minor detector unit 44 which are connected as shown in FIG. 15. The timing generator 41 generates various kinds of timing signals, such as 1T, 4T and 40T, which are required for the alarm detection operation at each stage. The timing selector 42 distributes the various kinds of timing signals from the timing generator 41 to the major detector unit 43 and the minor detector unit 44.

Figure 16:
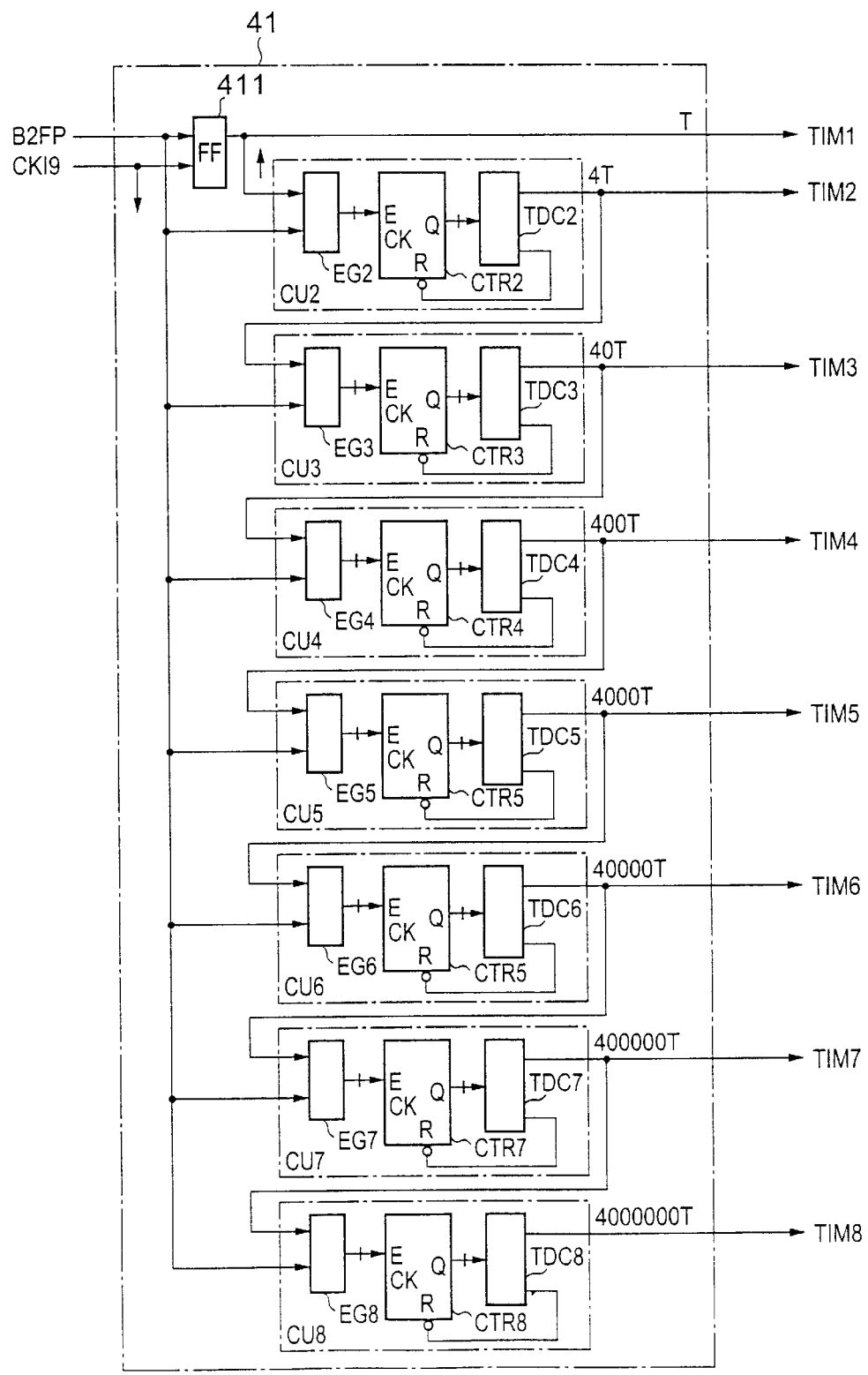
FIG. 16 is a system block diagram showing a timing generator of the third embodiment of the alarm detection apparatus.

FIG. 16 is a system block diagram showing the timing generator 41 of this embodiment. The timing generator 41 includes a flip-flop circuit (FF) 411, and counter units CU2 through CU8 which are connected as shown in FIG. 16. The flip-flop circuit (FF) 411 generates a timing signal TIM1 (1T) based on the input frame pulse signal B2FP. In the counter unit CU2, an edge detection circuit EG2 detects a rising edge of the timing signal 1T, and generates an edge pulse signal. A counter CTR2 counts this edge pulse signal from the edge detection circuit EG2, and cooperates with a timing decoder TDC2 to generate a timing signal TIM2 (4T) having a period which is 4 times the period of the timing signal 1T.

On the other hand, in the counter unit CU3, an edge detection circuit EG3 detects a rising edge of the timing signal 4T, and generates an edge pulse signal. A counter CTR3 counts this edge pulse signal from the edge detection circuit EG3, and cooperates with a timing decoder TDC3 to generate a timing signal TIM3 (40T) having a period which is 10 times the period of the timing signal 4T.

Similarly thereafter, timing signals TIM4 through TIM8 (400T through 4000000T) are generated by the cascade connection of counter units CU4 through CU8, so that the period of the timing signal generated from one stage is 10 times that of the timing signal generated from an immediately preceding stage of the cascade connection. In this particular case shown in FIG. 16, alarm cancel detection timing signals are generated by the timing selector 42, and only the alarm detection timing signals are generated by the timing generator 41.

Figure 17:
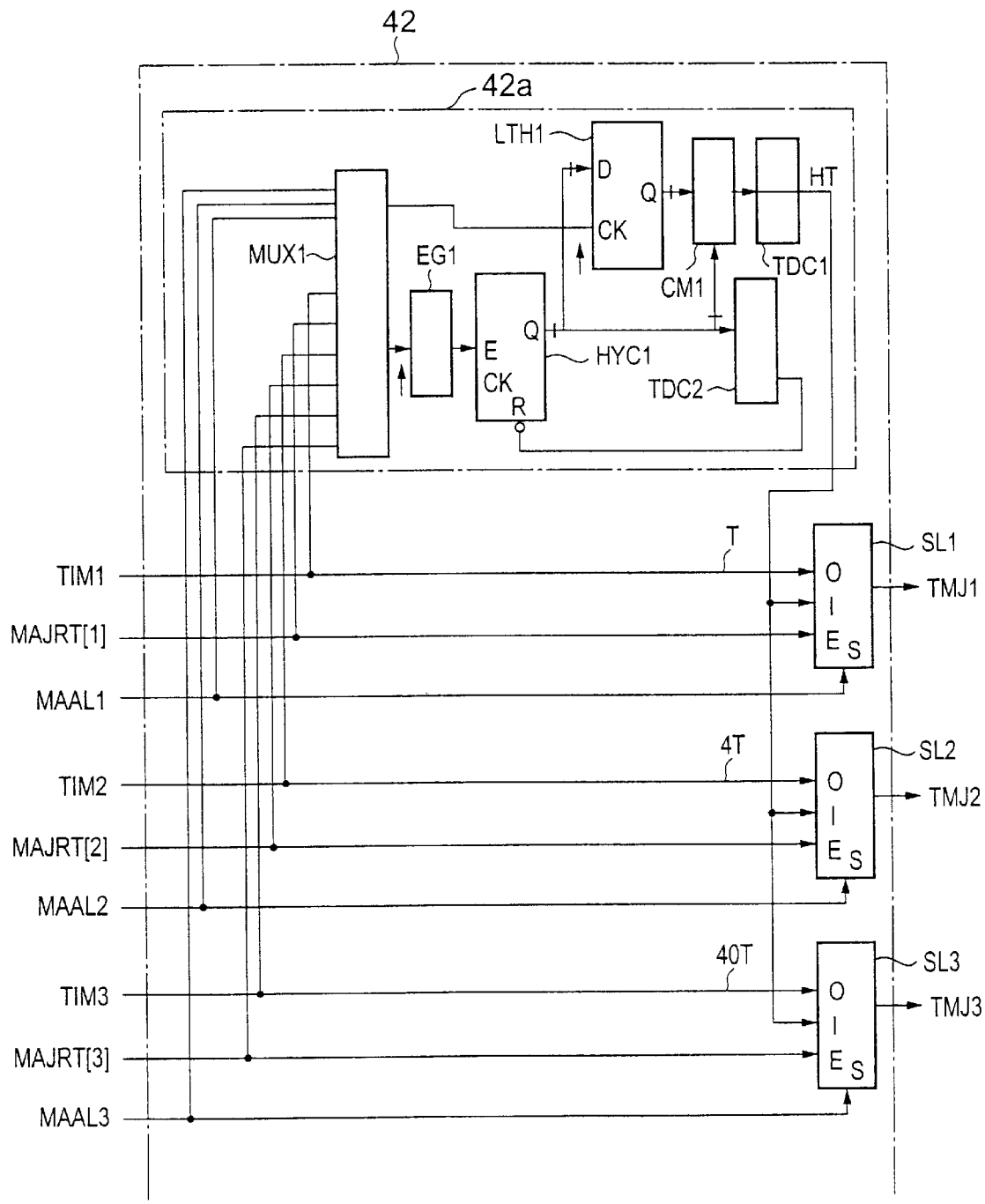
FIG. 17 is a system block diagram showing a part of a timing selector of the third embodiment of the alarm detection apparatus.
Figure 18:
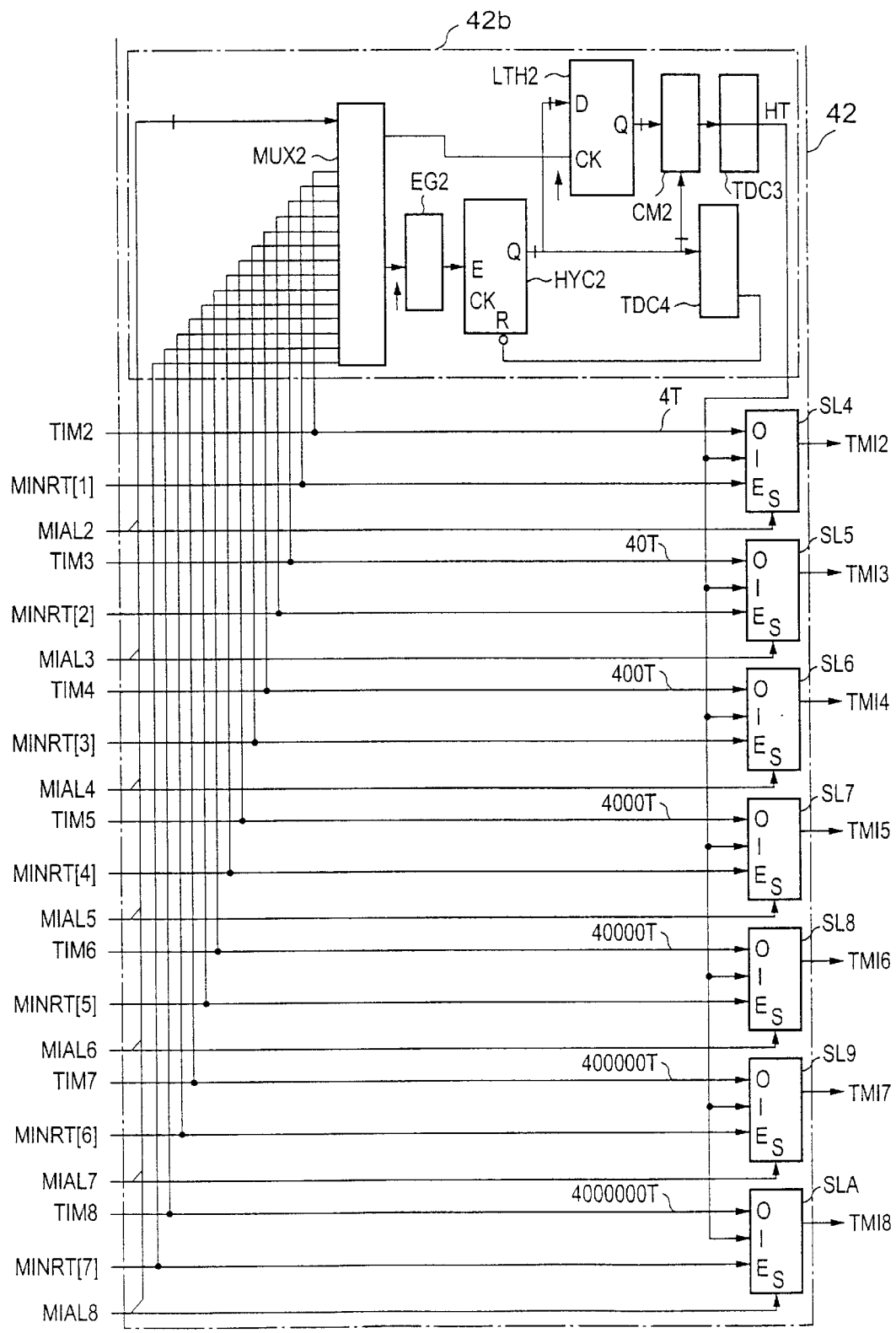
FIG. 18 is a system block diagram showing another part of the timing selector of the third embodiment of the alarm detection apparatus.

FIGS. 17 and 18 are system block diagrams showing the timing selector 42 of this embodiment. FIG. 17 shows a circuit part of the timing selector 42 corresponding to the major detector unit 43, and FIG. 18 shows a circuit part of the timing selector 42 corresponding to the minor detector unit 44.

In FIG. 17, a circuit part of a major hysteresis timing generator 42a including an edge detection circuit EG1, a hysteresis counter HYC1, a latch circuit LTH1, a comparator CM1, and timing decoders TDC1 and TDC2 has the same construction as the corresponding circuit part of the alarm detector 30 shown in FIG. 13 including the edge detection circuit (EG3) 19-3, the hysteresis counter (HYCT) 14, the latch circuit (LTH1) 33, the comparator (CM3) 17-3 and the timing decoders (TDC1 and TDC2) 15-1 and 15-2. By providing one hysteresis timing generator 42a with respect to the major detector unit 43, it is possible to further reduce the circuit scale of the alarm detection apparatus.

In other words, the major hysteresis timing generator 42a is provided with a data multiplexer MUX1 which corresponds to an AND-OR circuit. For example, when the major detection selection signal MAJRT[1]=1, the alarm signal MAAL1 is supplied to the clock input terminal CK of the latch circuit LTH1, and the timing signal TIM1 (1T) is supplied to the edge detection circuit EG1. In this case, the major hysteresis timing generator 42a generates a hysteresis timing signal HT (10T) which is in phase synchronism with the rising edge of the alarm signal MAAL1. On the other hand, a selector SL1 is enabled by the major detection selection signal MAJRT[1]=1, and outputs the alarm detection timing signal TIM1 (1T) as a major timing signal TMJ1 when the alarm detection signal MAAL1=0, and outputs the hysteresis timing signal HT (10T) from the major hysteresis timing generator 42a as an alarm cancel detection timing signal when the alarm detection signal MAAL1=1. Similarly, a selector SL2 is enabled by the major detection selection signal MAJRT[2]=1, and outputs the alarm detection timing signal TIM2 (4T) as a major timing signal TMJ2 when the alarm detection signal MAAL2=0, and outputs the hysteresis timing signal HT (40T) from the major hysteresis timing generator 42a as an alarm cancel detection timing signal when the alarm detection signal MAAL2=1. Further, a selector SL3 is enabled by the major detection selection signal MAJRT[3]=1, and outputs the alarm detection timing signal TIM3 (40T) as a major timing signal TMJ3 when the alarm detection signal MAAL3=0, and outputs the hysteresis timing signal HT (400T) from the major hysteresis timing generator 42a as an alarm cancel detection timing signal when the alarm detection signal MAAL3=1.

In FIG. 18, a circuit part of a minor hysteresis timing generator 42b including an edge detection circuit EG2, a hysteresis counter HYC2, a latch circuit LTH2, a comparator CM2, and timing decoders TDC3 and TDC4 has the same construction as the corresponding circuit part of the major hysteresis timing generator 42a shown in FIG. 17. In addition, selectors SL4 through SLA of the minor hysteresis timing generator 42b is arranged similarly to the selectors SL1 through SL3 of the major hysteresis timing generator 42a. By providing one hysteresis timing generator 42b with respect to the minor detector unit 44, it is possible to further reduce the circuit scale of the alarm detection apparatus.

Figure 19:
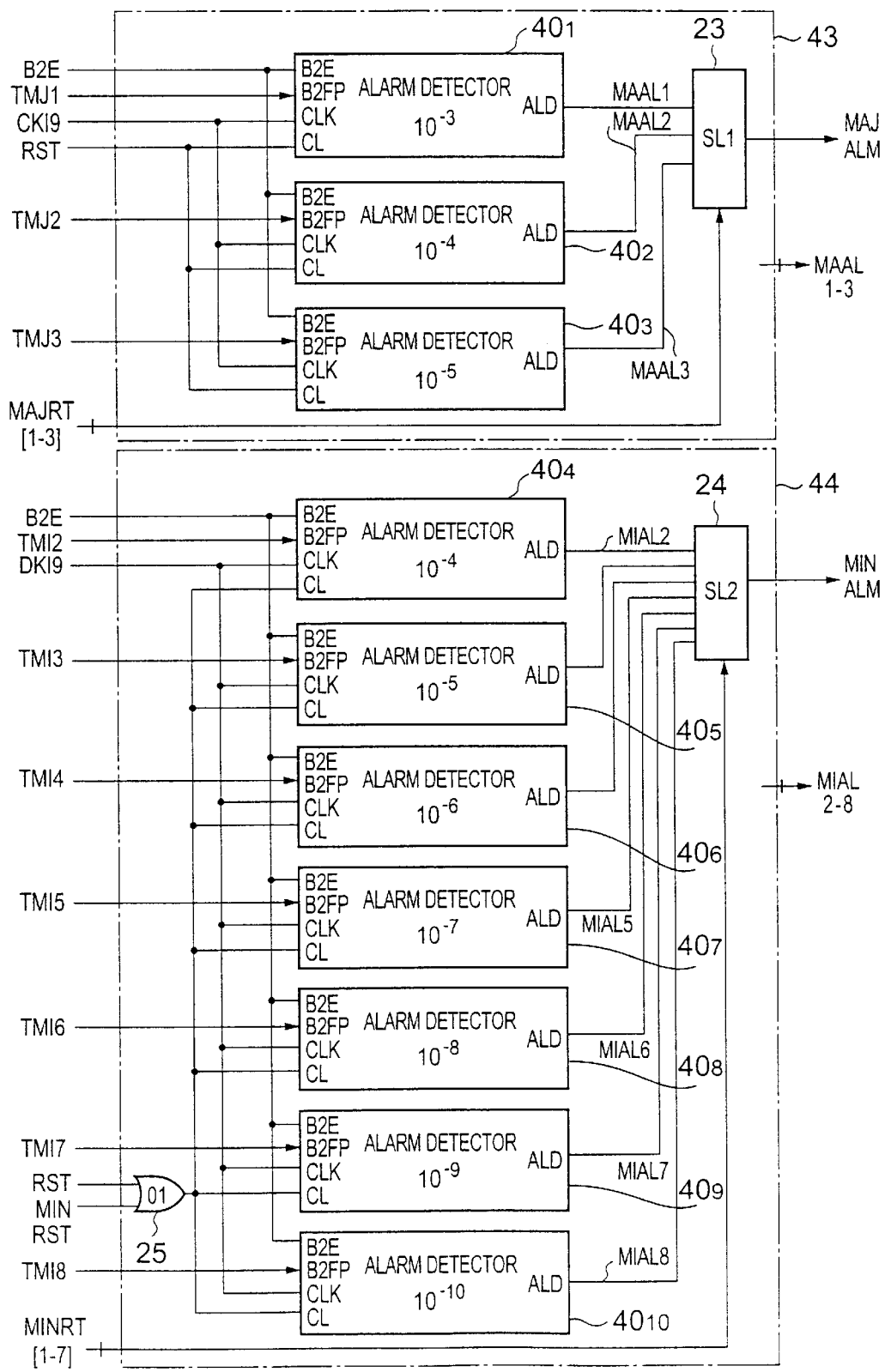
FIG. 19 is a system block diagram showing an alarm detection module of the third embodiment of the alarm detection apparatus.

FIG. 19 is a system block diagram showing an alarm detection mode of the third embodiment of the alarm detection apparatus. The construction of alarm detectors $40_1$ through $40_{10}$ shown in FIG. 19 will be described later in conjunction with FIG. 20. In FIG. 19, those parts which are the same as those corresponding parts in FIG. 12 are designated by the same reference numerals, and a description thereof will be omitted.

In the major detector unit 43, the alarm detection signal MAAL1 output from the alarm detector $40_1$ is selectively output from the selector (SEL1) 23 when the major detection selection signal MAJRT[1]=1. In addition, the major timing signal TMJ1 from the timing selector 42 is also input to the alarm detector $40_1$, where this major timing signal TMJ1 is the timing signal 1T when the alarm detection signal MAAL1=0 (detection mode) and is the timing signal 10T which is in phase synchronism with the rising edge of the alarm detection signal MAAL1 when the alarm detection signal MAAL1=1 (cancel detection mode). The alarm detectors $40_2$ and $40_3$ operate similarly to the alarm detector $40_1$, and the alarm detectors $40_4$ through $40_{10}$ of the minor detector unit 44 also operate similarly to the alarm detector $40_1$ of the major detector unit 43.

Figure 20:
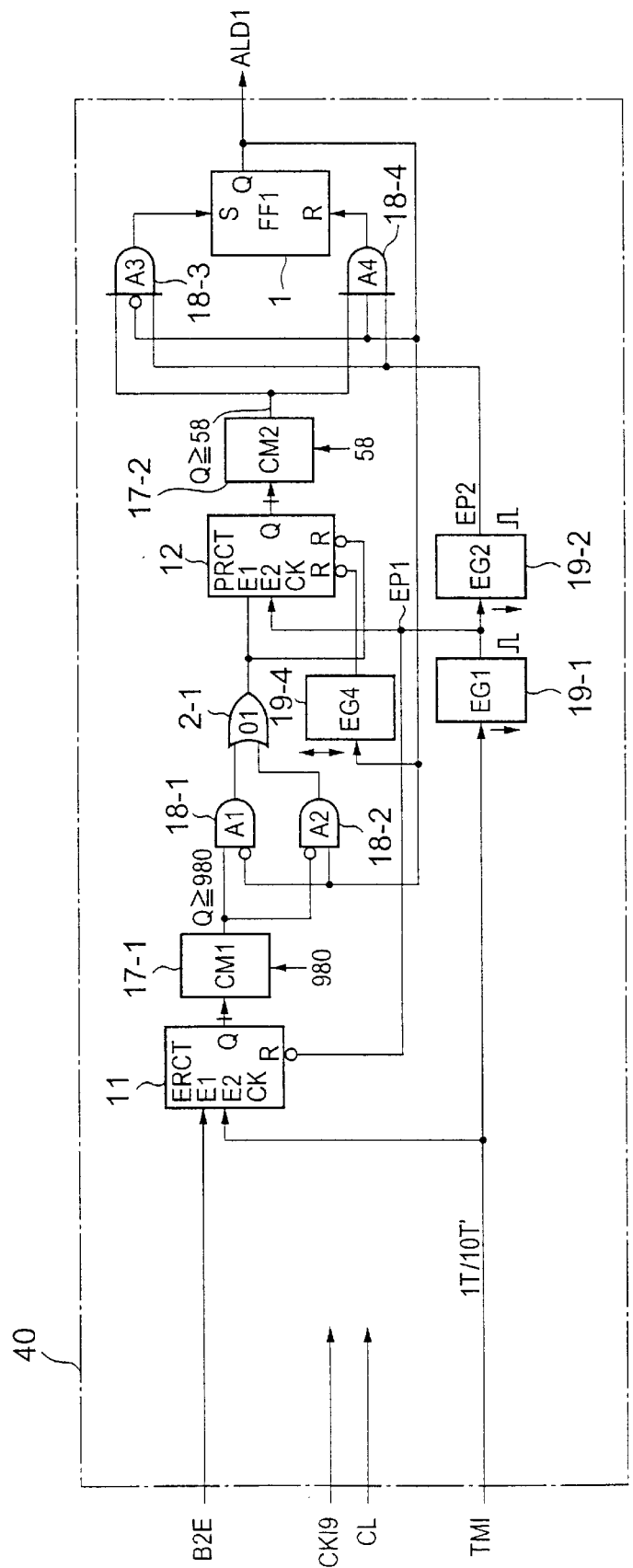
FIG. 20 is a system block diagram showing an alarm detector of the third embodiment of the alarm detection apparatus.

FIG. 20 is a system block diagram showing a typical construction of the alarm detector 40 which may be used in common for any of the alarm detectors $40_1$ through $40_{10}$ of this third embodiment. In FIG. 20, those parts which are the same as those corresponding parts in FIG. 13 are designated by the same reference numerals, and a description thereof will be omitted.

The alarm detector 40 shown in FIG. 20 has an extremely simple construction, because the circuit part related to the timing generation, such as the counters 13 and 14, and the circuit part related to the timing selection, such as the selector (SL1) 16, are separated from the alarm detector 40. When the alarm detection signal ALD1 output from the alarm detector 40 is ALD1=0 (detection mode), the alarm detection timing signal TM1 (1T) is input to the alarm detector 40, and when the alarm detection signal ALD1 is ALD1=1 (cancel detection mode), the alarm cancel detection timing signal TM1 (10T') which is in phase synchronism with the rising edge of the alarm detection signal ALD1 is input to the alarm detector 40. Hence, according to this third embodiment, it is possible to efficiently monitor the error rates of desired monitoring conditions, using a simple circuit having a small circuit scale.

In this third embodiment, the major hysteresis timing generator 42a and the minor hysteresis timing generator 42b are provided in common for each of the detection rates in the timing selector 42, but the present invention is not limited to this arrangement. For example, a hysteresis timing generator may be provided for each of the major detection rates and the minor detection rates. In this case, it is possible to generate various kinds of alarm detection timing signals of arbitrary multiplication factors in the timing generator 41, and the timing selector 42 can generate alarm detection timing signals having different multiplication factors for each detection rate. Accordingly, it is possible to realize an inexpensive alarm detection apparatus which can easily cope with various alarm detection and/or cancellation conditions.

In addition, it is possible to eliminate the major and minor hysteresis timing generators 42a and 42b from the timing selector 42, and instead generate various kinds of timing signals having arbitrary multiplication factors in the timing generator 41 for the alarm detection and for the alarm cancel detection if necessary. In this case, the alarm cancel detection timing signal from the timing generator 41 is input to an input terminal 1 of the selector SL1, so as to switch the alarm detection timing signal and the alarm cancel detection timing signal from the timing generator 41. Accordingly, it is possible to eliminate the major and minor hysteresis timing generators 42a and 42b from the timing selector 42 shown in FIGS. 17 and 18, thereby further reducing the circuit scale of the alarm detection apparatus, and making it possible to easily cope with various alarm detection and/or cancellation conditions.

On the other hand, although the present invention is applied to the STS-N frame of the SONET in each of the embodiments described above, the present invention can of course be applied to the monitoring of the Synchronous Transfer Mode-N (STM-N) frame of the SDH, and various other kinds of frame signals.

Therefore, according to the present invention, it is possible to improve the operation reliability, responses to the alarm detection and/or cancellation, and the like of the alarm detection apparatus. In addition, it is possible to construct a high-performance alarm detection apparatus having a greatly reduced and simplified circuit construction, at a low cost.

Further, the present invention is not limited to these embodiments, but various variations and modifications may be made without departing from the scope of the present invention.

What is claimed is:

1. An alarm detection apparatus comprising:
a plurality of alarm detectors detecting and/or cancelling alarms for identical and different error rates,
said plurality of alarm detectors being grouped into a major detector unit made up of alarm detectors which detect major error rates, and a minor detector unit made up of alarm detectors which detect minor error rates,
said major detector unit and said minor detector unit outputting detection outputs corresponding to specified detection rates thereof,
a predetermined alarm detector corresponding to a part of said minor detector unit having a specified detection rate overlapping a specified detection rate of said major detector unit being controlled, so that a detection function or a detection output of the predetermined alarm detector is disabled.

2. The alarm detection apparatus as claimed in claim 1, wherein said alarm detectors are formed by hardware.

3. An alarm detection apparatus comprising:
a plurality of alarm detectors detecting and/or cancelling alarms for different error rates; and
means, responsive to an alarm detection in an arbitrary alarm detector of said plurality of alarm detectors, for forcibly setting an alarm detection output of each of said plurality of alarm detectors which detect error rates smaller than that detected by said arbitrary alarm detector,
each of said alarm detectors starting a detection period for an alarm cancel detection thereof in synchronism with a detection of an alarm cancellation in an alarm detector which detects an error rate one level higher than an error rate detected thereby.

4. The alarm detection apparatus as claimed in claim 3, wherein said alarm detectors and said means are formed by hardware.

5. An alarm detection apparatus comprising:
a plurality of alarm detectors detecting alarms for different error rates,
each of said plurality of alarm detectors detecting an alarm of its own detection rate depending on an input timing signal and outputting a timing signal having a period which is n times a period of the input timing signal,
said plurality of alarm detectors being successively coupled in a cascade connection so that a timing signal output from one alarm detector is input to another alarm detector provided in a next stage.

6. The alarm detection apparatus as claimed in claim 5, wherein each of said plurality of alarm detectors detects a cancellation of an alarm detected thereby in response to the timing signal output therefrom.

7. The alarm detection apparatus as claimed in claim 5, wherein each of said plurality of alarm detectors comprises:
counter means for counting an input timing signal and generating a timing signal having a period which is n times a period of the input timing signal;
holding means for holding a counted value of said counter means in synchronism with an alarm detection of a certain alarm detector to which said holding means belongs; and
timing generating means for generating an alarm cancel detection timing signal which has a period n times the period of the input timing signal and is in phase synchronism with the alarm detection of the certain alarm detector to which said timing generating means belongs, based on a comparison of the counted value held by said holding means and the counted value of said counter means,
said certain alarm detector detecting a cancellation of an alarm detected thereby based on the alarm cancel detection timing signal from said timing generating means.

8. The alarm detection apparatus as claimed in claim 5, wherein said alarm detectors are formed by hardware.

9. An alarm detection apparatus comprising:
a timing generator generating a plurality of kinds of timing signals required to detect and/or cancel alarms of different error rates based on a pulse signal having a basic period;
a plurality of alarm detectors detecting and/or cancelling alarms for different alarms, each of said plurality of alarm detectors detecting and/or cancelling an alarm depending on a detection rate thereof based on an input timing signal; and
a timing selector, interposed between said timing generator and said plurality of alarm detectors, distributing the plurality of kinds of timing signals from said timing generator to said plurality of alarm detectors,
said timing selector supplying an alarm detection timing signal with respect to a corresponding alarm detector when no alarm is detected by said corresponding alarm detector, and supplying an alarm cancel detection timing signal with respect to said corresponding alarm detector when an alarm is detected by said corresponding alarm detector.

10. The alarm detection apparatus as claimed in claim 9, wherein said timing selector comprises:
counter means for counting an input timing signal and generating an alarm cancel detection timing signal having a period which is n times a period of the input timing signal;
holding means for holding a counted value of said counter means in synchronism with an alarm detection of said corresponding alarm detector; and
timing generating means for generating an alarm cancel detection timing signal which has a period n times the period of the input timing signal and is in phase synchronism with the alarm detection of said corresponding alarm detector, based on a comparison of the counted value held by said holding means and the counted value of said counter means.

11. The alarm detection apparatus as claimed in claim 9, wherein said timing selector comprises:

selecting means for selecting an alarm detection signal of said corresponding alarm detector and an alarm detection timing signal to be input to said corresponding alarm detector, depending on a specified error rate to be detected;

counter means for counting the alarm detection timing signal from said selecting means and generating an alarm cancel detection timing signal having a period which is n times a period of the alarm detection timing signal;

holding means for holding a counted value of said counter means in synchronism with an alarm detection of the alarm detection signal selected by said selecting means; and timing generating means for generating an alarm cancel detection timing signal which has a period n times the period of the input timing signal and is in phase synchronism with the alarm detection of said corresponding alarm detector, based on a comparison of the counted value held by said holding means and the counted value of said counter means.

12. The alarm detection apparatus as claimed in claim 9, wherein said timing generator, said alarm detectors and said timing selector are formed by hardware.

* * * * *